US008200590B2

(12) United States Patent
Triantafillidis

(10) Patent No.: US 8,200,590 B2
(45) Date of Patent: Jun. 12, 2012

(54) METHOD FOR SOLVING MINIMAX AND LINEAR PROGRAMMING PROBLEMS

(76) Inventor: Trifon Triantafillidis, Panorama (GR)

( * ) Notice: Subject to any disclaimer, the term of this patent is extended or adjusted under 35 U.S.C. 154(b) by 0 days.

(21) Appl. No.: 13/189,210

(22) Filed: Jul. 22, 2011

(65) Prior Publication Data

US 2012/0016828 A1 Jan. 19, 2012

Related U.S. Application Data

(63) Continuation of application No. 12/019,532, filed on Jan. 24, 2008, now Pat. No. 7,991,713.

(60) Provisional application No. 60/986,157, filed on Nov. 7, 2007.

(51) Int. Cl.
*G06F 15/18* (2006.01)
(52) U.S. Cl. ........................................ 706/14
(58) Field of Classification Search .................. None
See application file for complete search history.

(56) References Cited

U.S. PATENT DOCUMENTS

| 4,744,026 | A  | 5/1988  | Vanderbei    |
|-----------|----|---------|--------------|
| 5,325,445 | A  | 6/1994  | Herbert      |
| 5,649,068 | A  | 7/1997  | Boser et al. |
| 6,510,746 | B1 | 1/2003  | Kotwicki     |
| 6,546,379 | B1 | 4/2003  | Hong et al.  |
| 6,714,893 | B2 | 3/2004  | Busche et al.|
| 7,024,033 | B2 | 4/2006  | Li et al.    |
| 7,099,505 | B2 | 8/2006  | Li et al.    |
| 7,301,314 | B2 | 11/2007 | Schuellein et al. |
| 7,301,341 | B2 | 11/2007 | Hargreaves et al. |
| 7,301,615 | B2 | 11/2007 | Fukagawa et al.   |
| 7,305,641 | B2 | 12/2007 | Tang              |
| 7,991,713 | B2 | 8/2011  | Triantafillidis   |
| 2005/0192865 | A1 | 9/2005 | Boutilier et al. |
| 2007/0026406 | A1 | 2/2007 | El Ghaoui et al. |
| 2007/0053563 | A1 | 3/2007 | Tu et al.        |
| 2007/0104222 | A1 | 5/2007 | Luss             |

FOREIGN PATENT DOCUMENTS

WO  WO 2007/007249   1/2007

OTHER PUBLICATIONS

Sun "On the Convergence of an Iterative Method for the Minimax Problem", J. Austral. Math. Soc. Ser. B 39(1997), 280-292.*
Rockafellar, "Linear-quadratic programming and optimal control", SIAM Journal on Control and Optimization 25 (1987) 781-814.*
C. Zhu et al., "Primal-dual projected gradient algorithms for extended linear quadratic programming", SIAM J. Optimization 3 (1993) 751-783.*

(Continued)

*Primary Examiner* — Jeffrey A Gaffin
*Assistant Examiner* — Li-Wu Chang
(74) *Attorney, Agent, or Firm* — Dennis J. Dupray; StrategemIP Ltd.

(57) ABSTRACT

A novel method is disclosed for efficiently solving minimax problems, and in particular, for efficiently solving minimax problems wherein the corresponding matrix is large. In particular, the novel method solves minimax problems in $O(n^2 T)$ operation count, where n denotes the problem size and T is reversely proportional to the required duality gap as one skilled in the art will understand. Further disclosed herein is a method for solving linear programming (LP) problems by converting such problems into minimax problems, and then using the novel minimax solution method disclosed herein.

20 Claims, 3 Drawing Sheets

OTHER PUBLICATIONS

Charalambous et al. "An EmCIENT omOD to Solve the Minimax Problem Directly", SIAM J. Numer. Anal. vol. 15, No. 1, 1978, pp. 162-187.*

Charalambous et al. "An Efficient Method to Solve The MINIMAX Problem Directly", SIAM J. Numer. Anal. vol. 15, No. 1, 1978, pp. 162-187.*

Nesterov et al. "Primal-dual subgradient methods for convex problems", 2005, pp. 37 http://www.core.ucl.ac.be/services/psfiles/dp05/dp2005_67.pdf.*

Polyak "Smooth Optimization Methods for MINIMAX", SIAM J. Control and Optimization, vol. 26, No. 6, 1988, pp. 1274-1286.*

Zhu et al. "Primal-Dual Projected Gradient Algorithms for Extended Linear-Quadratic Programming", SIAM J. Optimization, 1992, pp. 33.*

Adler et al., "An Implementation of Karmarkar's Algorithm for Linear Programming", dated Mar. 14, 1989 (revised May 25, 1995), pp. 1-36.

Ferguson "Linear Programming—A Concise Introduction", date unknown, pp. 1-50.

Freund et al., "A decision-theoretic generalization of on-line learning and an application to boosting", AT&T Bell Laboratories, Sep. 20, 1995, pp. 1-34.

Freund et al., "Adaptive game playing using multiplicative weights", Games and Economic Behavior, Nov. 20, 1997, pp. 1-19.

Greenberg "An Algorithm for Determining Redundant Inequalities and All solutions to Convex Polyhedra", Numer. Math., vol. 24, 1975, pp. 19-26.

Hespanha "A Proof of the Minimax Theorem", Apr. 14, 2003, pp. 1-2.

Karmarkar "A New Polynomial-Time Algorithm for Linear Programming" AT&T Bell Laboratories, ACM, 1984, pp. 302-311.

Li et al., "FloatBoost Learning for Classification", Microsoft Research Asia, date unknown, 8 pages.

Markowitz "Portfolio Selection Efficient Diversification of Investments" Cowles Foundation for Research in Economics at Yale University, 1959, 356 pages.

Meir et al., "An Introduction to Boosting and Leveraging", date unknown, pp. 119-184.

Ratsch et al., "Maximizing the Margin with Boosting", J. Kivinen and R. H. Sloan (Eds.): COLT 2002, LNAI 2375, 2002, pp. 334-350.

Vanderbei "Linear Programming: Foundations and Extensions", Robert J. Vanderbei, 2001, 466 pages.

Viola et al., "Robust Real-time Object Detection", Secon International Wrokshop on Statistical and Computational Theories of Vision—Modeling, Learning, Computing, and Sampling, Vancouver, Canada, Jul. 13, 2001, pp. 1-25.

Morud "Studies on the Dynamics and Operation of Integrated Plants", Thesis, University of Trondheim, Norway, Dec. 1995, 166 pages.

Mcguigan et al., "Web Chapter B Linear-Programming Applications", Managerial Economics: Applications, Strategy and Tactics, 2002, pp. 1-26.

Mcguigan et al., "Web Chapter a Optimization Techniques", Managerial Economics: Applications, Strategy and Tactics, 2002, pp. 1-27.

* cited by examiner

METHOD FOR SOLVING MINIMAX AND LINEAR PROGRAMMING PROBLEMS

CROSS REFERENCE TO RELATED APPLICATIONS

The present application is a continuation of U.S. patent application Ser. No. 12/019,532, filed Jan. 24, 2008, now U.S. Pat. No. 7,991,713, which claims the benefit of U.S. Provisional Patent Application Ser. No. 60/986,157, filed Nov. 7, 2007; each of the above-identified applications are incorporated fully herein by reference.

BACKGROUND

Methods for solving minimax problems and linear programming problems are well known in the art. However, such methods can be inefficient. For example, in the worst case, the operation count for the Simplex algorithm is an exponential function of the problem size. Accordingly, only relatively small problems can be solved via this method. An improvement is Karmarkar's algorithm which is has a polynomial time bound. More specifically Karmarkar's algorithm requires an $O(n^{3.5} \ln L)$ operation count, where n denotes the problem size and L denotes the required accuracy in bits.

It would be advantageous to have a more efficient method for minimax problems, particularly wherein A is a large matrix such as 250×250 or larger, e.g., thousands of rows by thousands of columns. Additionally, it would be advantageous to use such a method for efficiently solving LP problems.

SUMMARY

A novel method is disclosed for efficiently solving minimax problems, and in particular, for efficiently solving minimax problems wherein the corresponding matrix is large. In particular, the novel method solves minimax problems in $O(n^2 T)$ operation count, where n denotes the problem size and T is reversely proportional to the required duality gap as one skilled in the art will understand. Further disclosed herein is a method for solving linear programming (LP) problems by converting such problems into minimax problems, and then using the novel minimax solution method disclosed herein.

For computing an efficient solution to a minimax problem represented by an m by n matrix $A=[a_{i,j}]$, $1 \leq i \leq m$ and $1 \leq j \leq n$, in one embodiment, the present disclosure provides the following steps:

Step 1. accessing the matrix A from a data store operatively communicating one or more computer processors, wherein the entries of A are representative of evaluations of a plurality of different predetermined physical conditions of a predetermined physical system;

Step 2. storing in the data store an initial approximation $x=(x_1, x_2, \ldots, x_n)$ for $x^*$, and $y=(y_1, y_2, \ldots, y_m)$ for $y^*$, wherein $x^*$, $y^*$ denote the intermediate (and ultimately final) values for the minimax solution;

Step 3. determining at least one estimate v for an equilibrium point of the minimax problem, the estimate dependent upon x, y, and A;

Step 4. repeating the steps of A through F following;

(A) obtaining for x at least one adjustment $\Delta x$, wherein $\Delta x$ is dependent on at least one positive difference between: (i) a predetermined function of entries of A and y, and (ii) v;

(B) computing, using at least one of computer processors, an updated value for x from a convex combination of x and $\Delta x$;

(C) updating $x^*$ with the updated value for x when a first predetermined condition holds, wherein the first condition is dependent upon Ax and Az, where z is determined from an instance of x obtained in a prior iteration of the steps A through F;

(D) obtaining for y at least one adjustment $\Delta y$, wherein $\Delta y$ is dependent on at least one positive difference between: (i) v, and (ii) a predetermined function of entries of A and x;

(E) computing, using at least one of computer processors, an updated value for y from a convex combination of y and $\Delta y$;

(F) updating $y^*$ with the updated value for y when a second predetermined condition holds, wherein the second condition is dependent upon y'A and z'A, where z is determined from an instance of y obtained in a prior iteration of the steps A through F; and Step 5. outputting information determined from the resulting values for $x^*$ and $y^*$ for, e.g., one of: moving of a physical component of the physical system, changing a computer display for representing the one physical condition, and allocating a collection of resources (e.g., financial assets, network bandwidth, etc.).

Moreover, the computational complexity of Step 4 is $O(m \times n \times T)$, where T is the number of iterations of the steps A through F above.

Other features and benefits of the one or more inventions disclosed herein are provided in the description following together with the accompanying figures. It is to be expressly understood that the present Summary provides only a brief description of the inventive aspects disclosed herein.

DETAILED DESCRIPTION

Figure 1:
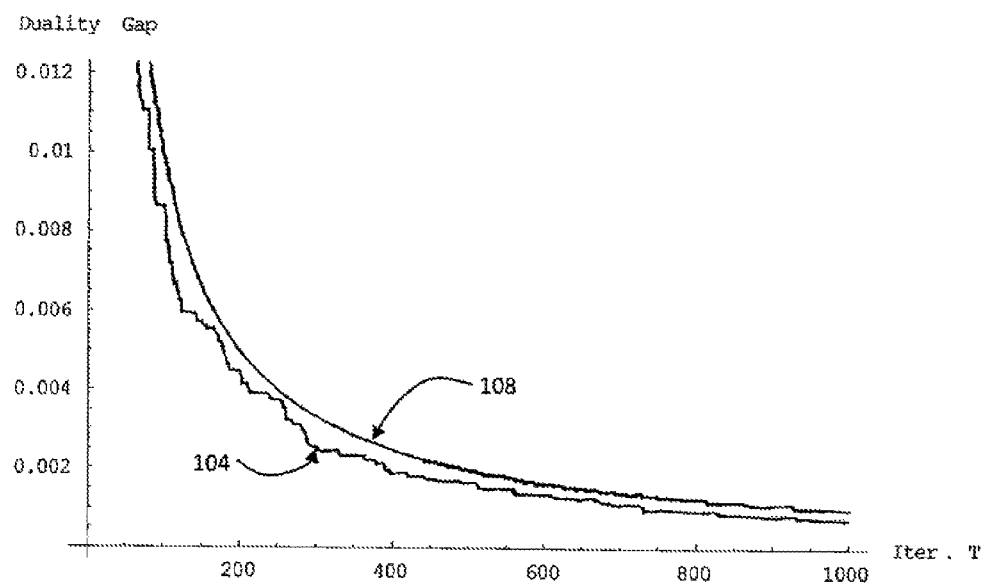
FIG. 1 shows a graph 104 of the duality gap versus the number of iterations (T) of the lines 11-30 of the Blubit algorithm disclosed hereinbelow, wherein the graph 104 was obtained from a large sample of square matrices whose values were randomly generated. Additionally shown is the graph 108 of the function 1/T, wherein the graph 108 bounds the graph 104.

Prior to describing the novel minimax method and its application, additional technical background material is provided in the following Problem Definition section.

Problem Definition

The minimax theorem proved by John von Neumann in 1928 states that for every m×n matrix $A \in \mathbb{R}^{m \times n}$ and probability vectors $x \in \mathbb{R}^n$ and $y \in \mathbb{R}^m$ wherein $$x \in \mathcal{X} := \left\{ x \in \mathbb{R}^n : \sum_{j=1}^{n} x_j = 1 \right\} \quad (1.1)$$

$$y \in \mathcal{Y} := \left\{ y \in \mathbb{R}^m : \sum_{i=1}^{m} y_i = 1 \right\} \quad (1.2)$$

the following relation holds $$\max_{x \in \mathcal{X}} \min_{y \in \mathcal{Y}} y'Ax = \min_{y \in \mathcal{Y}} \max_{x \in \mathcal{X}} y'Ax \quad (1.3)$$

where y' denotes the transpose of y.

We call the vectors $x^*$, $y^*$ a minimax solution of A if they satisfy (1.3). The scalar $v^* = (y^*)'Ax^*$ is the value at the equilibrium point and in a game theory context it is called the game value. For any other vectors $x \in \mathcal{X}$, $y \in \mathcal{Y}$ it will be $$y'Ax^* \geq v^* = (y^*)'Ax^* \geq (y^*)'Ax \quad \forall x \in \mathcal{X}, \forall y \in \mathcal{Y} \quad (1.4)$$

Finding one (not necessarily unique) pair of vectors $x^*$, $y^*$ satisfying (1.4) solves the minimax problem.

We call a pure strategy any probability vector for which $$x_{j=k}=1, x_{j \neq k}=0, 1 \leq k \leq n \quad (1.5)$$

$$y_{i=k}=1, y_{i \neq k}=0, 1 \leq k \leq m \quad (1.6)$$

A pure strategy for y can always be applied in (1.3), therefore we may conclude that $x^*$ is not optimal unless $$\rho^* = \min_{0 \leq i \leq m} Ax^* = v^* \quad (1.7)$$

and also for the same reason $y^*$ is not optimal unless $$\gamma^* = \max_{1 \leq j \leq n} (y^*)'A = v^* \quad (1.8)$$

therefore $$\rho^* = \gamma^* = v^* \quad (1.9)$$

It can be easily shown that the reverse statement is also true. If for any probability vectors x, y wherein $$\rho = \min_{1 \leq i \leq m} Ax = \max_{1 \leq j \leq n} y'A = \gamma \quad (1.10)$$

then the vectors x, y provide a minimax solution.

Obviously for any pair of non optimal vectors x, y it will be $$\rho = \min_{0 \geq i \geq m} Ax \leq v^* \leq \max_{0 \geq j \geq n} y'A = \gamma \quad (1.11)$$

with $\gamma > \rho$. We call the positive difference $$d = \gamma - \rho \geq 0 \quad (1.12)$$

the duality gap (for the matrix A and the vectors x, y). Any algorithm which gradually reduces the duality gap to zero, solves the minimax problem.

The Novel Minmax Algorithm

Preliminaries

Given a m×n matrix $A=[a_{i,j}]$ wherein a minimax solution for this matrix is to be computed, without loss of generality we will assume that A contains elements within the range [0,1], wherein not all $a_{i,j}$ are identical. If not all $a_{i,j}$ are in the range [0,1], and assuming on not all $a_{i,j}$ are identical, then apply a transformation to all matrix elements so that $$a_{i,j} = \frac{a_{i,j} - a_{min}}{a_{max} - a_{min}}$$

where $a_{min}$, $a_{max}$ denote the minimum and the maximum of the matrix elements respectively. If not all $a_{i,j}$ are in the range [0,1], and not all $a_{i,j}$ are identical, then merely scale the entries of the matrix A so that all the entries are in the range [0,1]. Let U be a m×n matrix with every elements equal to 1. It can be easily shown that any matrix B in the form $$B = c_1 \cdot (A + c_2 \cdot U)$$

shares the same minimax solutions as matrix A. Selecting suitable constants $c_1$, $c_2$ can ensure that all matrix elements will fall within the range [0,1].

The Novel (Bluebit) Algorithm

At a very high level, psuedo code (and a description thereof) for the novel minimax algorithm is as follows.

The algorithm accepts as input:
1) One matrix A with m rows by n columns, with elements in the range [0,1] (no less than 0 and not greater than 1) and,
2) One integer parameter T>0 specifying the maximum number of iterations we would like to be performed.

The algorithm outputs are:
1) One n dimensional probability vector $x^*$ (an ordered collection of n nonnegative numbers whose sum is 1),
2) One in dimensional probability vector $y^*$ (an ordered collection of in nonnegative numbers whose sum is 1),
3) A positive real number $d^*$ representing the duality gap of the solution.

In one embodiment, the algorithm can be represented with the following high level steps:

Step A. Initialize vectors x and y to initial probability distributions such as $x=[1/n, 1/n, \ldots, 1/n]$, and $y=[1/m, 1/m, \ldots, 1/m]$. However, other probability distributions may also be used such as $[1/2n, 3/2n, 1/2n, \ldots, 1/2n]$ (assuming n is odd), and $y=[1/2m, 3/2m, 1/2m, \ldots, 3/2m]$ (assuming m is even) or even random probability distributions.

Step B. An initial estimation of the game value or equilibrium point $v^*$ is computed as the value of the parameter v as follows:

$$v = \frac{\max y'A + \min Ax}{2}$$

where, as before, y' denotes the transpose of y.

Step C. Perform T number of iterations of the following steps:
(i) The product y'A is computed, and together with v is used to compute an update vector $\Delta x$ for the vector x, wherein when x is updated by $\Delta x$, the elements of x also sum to 1, and $\Delta x$ moves the updated x towards the direction of increasing the product y'Ax. The movement of x toward the direction of increasing the product y'Ax can be seen since for g=y'A, the product y'Ax can be written as g'x. Therefore at iteration loop t+1, $$y'Ax_{t+1} = g'x_{t+1}$$
$$= g'((1-d)x_t + d\Delta x)$$
$$= (1-d)g'x_t + dg'\Delta x$$
$$= (1-d)y'Ax_t + dg'\Delta x$$

The condition for y'Ax$_{t+1}$>y'Ax$_t$ is that g'Δx>g'x$_t$. This is true because g'Δx is a convex combination of g$_j$ across probability vector Δx, but Δx has been formed by selecting only those directions Δx$_j$ where g$_j$>v and excluding the smaller g$_j$'s. Note that since y'Ax$_{t+1}$= (1−d)y'Ax$_t$+dg'Δx=(1−d)y'Ax$_t$+dy'AΔx, and y'Ax$_{t+1}$>y'Ax$_t$, when d=1, this implies that y'AΔx>y'A|$_{[djd1]}$x$_t$.

(ii) The update direction Δx is combined with x, and if the updated x produces a smaller duality gap (i.e., Step 13 hereinbelow), then x* is set to x.

(iii) The updated vector x is used to update the estimation of v.

(iv) The product Ax is computed, and together with v is used to compute an update vector Δy for the vector y, wherein when y is updated by Δy, the elements of y also sum to 1, and Δy moves the updated y towards the direction of decreasing the product y'Ax. That is, the movement of y toward the direction of decreasing the product y'Ax can be seen since for h=Ax, the product y'Ax can be written as y'h. Therefore at iteration loop t+1, $$y'_{t+1}Ax = y'_{t+1}h$$
$$= ((1-d)y_t + d\Delta y)'h$$
$$= (1-d)y'_t h + d\Delta y'h$$
$$= (1-d)y'_t Ax + d\Delta y'h$$

The condition for y'$_{t+1}$Ax<y'$_t$Ax is that Δy'h<y'$_t$h. This is true because Δy'h is a convex combination of h$_i$ across probability vector Δy, but Δy has been formed by selecting only those directions Δy$_i$ where h$_i$<v and excluding the larger h$_i$'s. Accordingly, in a similar manner to (i) above, since y$_{t+1}$'Ax=(1−d)y'$_t$Ax+dΔy'h=(1−d)y'$_t$Ax+dΔy'Ax, and y'$_{t+1}$Ax<y'$_t$Ax, when d=1, this implies that Δy'Ax<y'$_t$Ax.

(v) The update direction Δy is combined with y, and if the updated y produces a smaller duality gap (i.e., Step 18 hereinbelow), then y* is set to y.

(vi) The updated vector y is used to update the estimation of v.

In more detail the algorithm can be represented by the following steps:

Step 1: An initial n dimensional vector x is defined as, e.g., a uniform distribution. (i.e., all elements are set to the same value which is equal to 1/n). Set x*=x.

Step 2: The matrix-vector product Ax is computed and stored in a m dimensional vector denoted h. Therefore, each element h$_i$ of the vector h will be equal to the sum of the elements of row ti of matrix A, each such element multiplied by a corresponding element of the vector x. Therefore we set h$_i$=Σ$_{j=1}^n$ a$_{i,j}$·x$_j$.

Step 3: The minimum element of the vector h is used to initialize the variables ρ and ρ$_{max}$.

Step 4: An initial m dimensional vector y is defined as, e.g., a uniform distribution. (e.g., all elements are set to the same value which is equal to 1/m). Set y*=y.

Step 5: The matrix-vector product y'A is computed and stored in a n dimensional vector named g. Therefore, each element g$_j$ of the vector g will be equal to the sum of the elements of column j of matrix A each such element multiplied by a corresponding element of the vector y. Therefore we set g$_j$=Σ$_{i=1}^m$ a$_{ij}$·y$_i$.

Step 6: The maximum element of the vector g is used to initialize the variables γ and γ$_{min}$.

Step 7: An initial estimation of the game value v is computed as the middle point between γ$_{min}$ and ρ$_{max}$, that is $$v = \frac{\gamma_{min} + \rho_{max}}{2}.$$

Note that v is an estimation of v*, and v may be defined in other ways as well such as v=y'Ax≅(y*)'Ax*=v*.

Step 8: Initiate a loop and repeat all the following steps 9 through 18 T times

Step 9: Compute an update direction Δx=(Δx$_1$, Δx$_2$, Δx$_3$, . . . , Δx$_n$) for the vector x. This is done by subtracting from each element g$_j$ of the vector g the value of v to obtain the corresponding element Δx$_j$, 1≦j≦n. Then only the positive differences are selected and normalized so that the sum of the Δx$_j$, 1≦j≦n is equal to 1. Therefore, each element of the update vector Δx equals $$\Delta x_j = \begin{cases} g_j - v & \text{if } g_j > v \\ 0 & \text{if } g_j \leq v \end{cases}$$

and then Δx$_j$'s are normalized so that Σ$_{j=1}^n$Δx$_j$=1. Note that alternative definitions for Δx$_j$ are within the scope of the present disclosure, e.g., $$\Delta x_j = \begin{cases} f(g_j) & \text{if } g_j > v \\ 0 & \text{if } g_j \leq v \end{cases}$$

where $f(g)$ is a strictly increasing function of g with the additional properties $$f(v)=0$$

and also $$\sum_{j=1}^n [g_j > 0] f(g_j) = 1$$

A few examples of such functions which can be used for $f(g)$ are given below $$f(g) = \frac{1}{\lambda}(g-v)$$

$$f(g) = \frac{1}{\lambda}(g-v)^2$$

-continued $$f(g) = \frac{1}{\lambda}(g^2 - v^2)$$

$$f(g) = \frac{1}{\lambda}(\exp(g - v) - 1)$$

$$f(g) = \frac{1}{\lambda}(\exp(g) - \exp(v))$$

$$f(g) = \frac{1}{\lambda}\ln(1 + g - v)$$

$$f(g) = \frac{1}{\lambda}\ln\frac{g}{v}$$

In all the above occasions $\lambda$ represents a normalizing constant which ensures that $$\sum_{j=1}^{n} \Delta x_j = \sum_{j=1}^{n} [g_j > 0] f(g_j) = 1$$

Further, note that in some embodiments, less than all of the $\Delta x_j$'s that can be computed as a function of a positive difference are computed. In particular, for each iteration of the loop commencing at step 8, various combinations of the $\Delta x_j$'s may be determined and the rest assigned zero. Thus, on a first loop iteration, $\Delta x_j$'s may be computed for j=1, 2, 3, ..., n until, e.g., three non-zero values are computed, and only these three nonzero values are used to compute the resulting normalized $\Delta x$. Accordingly, on the second loop iteration, the $\Delta x_j$'s for any other indices for j that were not computed as nonzero in the first iteration may be used to compute the resulting second normalized instance of $\Delta x$. In a third loop iteration, $\Delta x_j$'s are computed for j=1, 2, 3, ..., n until, e.g., all non-zero values are computed, and used to compute the resulting normalized third version of $\Delta x$. Subsequently, additional loop iterations follow the pattern for computing $\Delta x$ for the loop iterations one through three. Accordingly, a fourth loop iteration, may compute $\Delta x$ in the same manner as the first loop iteration.

Step 10: Combine the update direction $\Delta x$ with x. This is done by updating the value of x as follows:

$$x \leftarrow (1-d) \cdot x + d \cdot \Delta x$$

where d can be either equal to the current duality gap $d = \gamma - \rho$, or it can be set to a gradually minimized value such as $d = 1/t$ where t is the current loop count.

Step 11: The value of the vector h=Ax is recomputed as in step 2.

Step 12: The value of $\rho$=min h is updated.

Step 13: If the value of $\rho$ is greater than $\rho_{max}$ then set $\rho_{max}=\rho$, and update the value of $$v = \frac{\gamma_{min} + \rho_{max}}{2},$$

and record $x^* = x$ as the best up to now value for the vector x. If $\gamma_{min} = \rho_{max}$ then exit the algorithm with the values of $x^*$, $y^*$ as an exact minimax solution with $d^*=0$.

Step 14: Compute an update direction $\Delta y$ for the vector y. This is done by subtracting from v each element of the vector h.

Then only the positive differences are selected and normalized so that the sum is equal to 1. Therefore at first each element of the update vector $\Delta x$ equals to $$\Delta y_i = \begin{cases} v - h_i & \text{if } h_i < v \\ 0 & \text{if } h_i \geq v \end{cases}$$

and then it is normalized so that $\Sigma_{i=1}^{n} \Delta y_i = 1$. Note that alternative definitions for $\Delta y_i$ are within the scope of the present disclosure, e.g., $$\Delta y_i = \begin{cases} f(h_i) & \text{if } h < v_i \\ 0 & \text{if } h_i \geq v \end{cases}$$

where $f(h_i)$ is a strictly decreasing function of $h_i$ with the additional properties $f(v)=0$ and also $$\sum_{i=1}^{m} [h_i < 0] f(h_i) = 1$$

A few examples of such functions which can be used for $f(h)$ are given below $$f(h) = \frac{1}{\lambda}(v - h)$$

$$f(h) = \frac{1}{\lambda}(v - h)^2$$

$$f(h) = \frac{1}{\lambda}(v^2 - h^2)$$

$$f(h) = \frac{1}{\lambda}(\exp(v - h) - 1)$$

$$f(h) = \frac{1}{\lambda}(\exp(v) - \exp(h))$$

$$f(h) = \frac{1}{\lambda}\ln(1 + v - h)$$

$$f(h) = \frac{1}{\lambda}\ln\frac{v}{h}$$

In all the above occasions $\lambda$ represents a normalizing constant which ensures that $$\sum_{i=1}^{m} \Delta y_i = \sum_{i=1}^{m} [h_i < 0] f(h_i) = 1$$

Further, note that in some embodiments, less than all of the $\Delta y_i$'s that can be computed as a function of a positive difference are computed. In particular, for each iteration of the loop commencing at step 8, various combinations of the $\Delta y_i$'s may be determined and the rest assigned zero. Thus, on a first loop iteration, $\Delta y_i$'s may be computed for i=1, 2, 3, ..., m until, e.g., three non-zero values are computed, and only these three nonzero values are used to compute the resulting normalized $\Delta y$. Accordingly, on the second loop iteration, the $\Delta y_i$'s for any other indices for j that were not computed as nonzero in the first iteration may be used to compute the resulting second normalized instance of $\Delta y$. In a third loop iteration, $\Delta n$'s are computed for j=1, 2, 3, ..., m until, e.g., three non-zero values are computed, and only these three nonzero values are used to compute the resulting normalized third version of $\Delta y$. Subsequently, additional loop iterations follow the pattern for computing $\Delta x$ for the loop iterations one through three. Accordingly, a fourth loop iteration, may compute $\Delta x$ in the same manner as the first loop iteration.

Step 15: Combine the update direction $\Delta y$ with y. This is done by updating the value of y as $$y \leftarrow (1-d) \cdot y + d \cdot \Delta y$$

where d can be either equal to the current duality gap $d=\gamma-\rho$, or it can be set to a gradually minimized value such as $d=1/t$ where t is the current loop count.

Step 16: The value of the vector $g=y'A$ is recomputed as in step 5.

Step 17: The value of $\gamma=\max g$ is updated.

Step 18: If the value of $\gamma$ is less than then set $\gamma_{min}=\gamma$, and update the value of $$v = \frac{\gamma \min + \rho \max}{2},$$

and record $y^*=y$ as the best up to now value for the vector y. If $\gamma_{min}=\rho_{max}$ then exit the algorithm with the values of $x^*$, $y^*$ as an exact minimax solution with $d^*=0$.

Step 19: Compute the duality gap as $d^*=\gamma_{min}-\rho_{max}$.

Accordingly, the novel minimax algorithm disclosed herein is computationally different from prior art minimax algorithms in that the presently disclosed algorithm:

(i) Iteratively computes the incremental adjustments $\Delta x$ and $\Delta y$ for obtaining approximations of x for $x^*$, and y for $y^*$;

(ii) Such incremental adjustments, $\Delta x$ and $\Delta y$, are respectively dependent on functions p(j) and q(i), wherein positive differences are computed, e.g., $p(j)=g_j-v$ and $q(i)=v-h_i$ (or other variations as disclosed hereinabove);

(iii) Such incremental adjustments $\Delta x$ and $\Delta y$ are combined with their respective approximations of x for $x^*$, and y for $y^*$, wherein the combining is dependent on a series of positive values that converge to zero as $\gamma$ and $\rho$ move closer together, and more preferably wherein a new (vector) value for x is determined as a convex combination of the current x and $\Delta x$ (e.g., $x \leftarrow (1-d) \cdot x + d \cdot \Delta x$, wherein d is $0 < d = \gamma - \rho < 1$), and wherein a new (vector) value for y is determined as a convex combination of the current y and $\Delta y$ (e.g., $y \leftarrow (1-d) \cdot y + d \cdot \Delta y$, wherein d is $0 < d = \gamma - \rho < 1$).

A still further detailed computer psuedo-code implementation of the novel Bluebit algorithm follows, wherein a corresponding computer executable version is well within the skill of one of ordinary skill in the art. Moreover, such computer executable code may be distributed over a plurality computer processors that operatively communicate with one another and with a p, data storage for storing the matrix A, the values of x, y, $\Delta x$, $\Delta y$, $\rho$, $\rho_{max}$, $\gamma$, and $\gamma_{min}$. In particular, a client computer node of a network may determine and transmit the matrix A and a requested number of iterations (T) to another computer on the network (e.g., a server) for performing the Bluebit minimax algorithm. Additionally, the client computer may specify the functions to be used in determining the initial values for x, and y as well as, e.g., functions for computing v, $\Delta x_j$, and $\Delta y_i$ as disclosed hereinabove.

One particular embodiment of the Bluebit algorithm follows. Note that the variables in the following computer psuedo-code have the same meanings has been described hereinabove.

| Bluebit Algorithm |
|---|
| input: m × n matrix A, number of iterations T |
| output: mixed strategies $y^* \in \mathbb{R}^m$, $x^* \in \mathbb{R}^n$, duality gap $d^*$ |
| 1    begin |
| 2    $x_j^*, x_j \leftarrow \frac{1}{n} \forall\, 1 \le j \le n$ |
| 3    $y_i^*, y_i \leftarrow \frac{1}{m} \forall\, 1 \le i \le m$ |
| 4    $h \leftarrow Ax$ |
| 5    $g \leftarrow y'A$ |
| 6    $\rho \leftarrow \min h$ |
| 7    $\gamma \leftarrow \max g$ |
| 8    $\rho_{max} \leftarrow \rho$ |
| 9    $\gamma_{min} \leftarrow \gamma$ |
| 10    $v \leftarrow \frac{\gamma_{min} + \rho_{max}}{2}$ |
| 11    for t = 1 to T do |
| 12      $\Delta x_j \leftarrow (g_j - v) \cdot [g_j > v]$ |
| 13      $x \leftarrow (1 - \gamma + \rho) \cdot x + (\gamma - \rho) \cdot \frac{\Delta x}{\sum_{j=1}^{n} \Delta x_j}$ |
| 14      $h \leftarrow Ax$ |
| 15      $\rho \leftarrow \min h$ |
| 16      if $\rho > \rho_{max}$ then |
| 17        $\rho_{max} \leftarrow \rho$ |
| 18        $x^* \leftarrow x$ |
| 19        $v = \frac{\gamma_{min} + \rho_{max}}{2}$ |
| 20        if $\rho_{max} = \gamma_{min}$ then goto Exit |
| 21      endif |
| 22      $\Delta y_i \leftarrow (v - h_i) \cdot [h_i < v]$ |
| 3      $y \leftarrow (1 - \gamma + \rho) \cdot y + (\gamma - \rho) \cdot \frac{\Delta y}{\sum_{i=1}^{m} \Delta y_i}$ |
| 24      $g \leftarrow y'A$ |
| 25      $\gamma \leftarrow \max g$ |
| 26      if $\gamma < \gamma_{min}$ then |
| 27        $\gamma_{min} \leftarrow \gamma$ |
| 28        $y^* \leftarrow y$ |
| 29        $v \leftarrow \frac{\gamma_{min} + \rho_{max}}{2}$ |
| 30        if $\rho_{max} = \gamma_{min}$ then goto Exit |
| 31      endif |
| 32    endfor |
| 33    Exit: $d^* = \gamma_{min} - \rho_{max}$ |
| 34    end |

Description

Lines 2-3

In the initialization part of the algorithm we initialize all elements of x and $x^*$ to 1/n and all elements of y and $y^*$ to 1/m.

Lines 4-5

Create h, a m dimensional vector as the result of the matrix-vector multiplication Ax. Therefore each element of h will be equal to $$h_i = \sum_{j=1}^{n} a_{i,j} x_j \quad \forall\ 1 \le i \le m$$

In the same way create g, a n dimensional vector being the result of the vector-matrix multiplication y'A, having each of its elements equal to $$g_j = \sum_{i=1}^{m} a_{i,j} y_i \quad \forall\ 1 \le j \le n$$

Lines 6-9

Set $\rho$ to the minimum element of the vector h and $\gamma$ to the maximum element of the vector g. We also initialize $\rho_{max}$ to $\rho$ and $\gamma_{min}$ to $\gamma$.

Line 10

Define v as the average of $\gamma_{min}$, $\rho_{max}$.

Line 11-30

Repeat for a number of T iterations.

Lines 12-13

Define a n-dimensional vector $\Delta x$ with each $\Delta x_j$ equal to $$\Delta x_j = \begin{cases} g_j - v & \text{if } g_j > v \\ 0 & \text{if } g_j \le v \end{cases}$$

then normalize $\Delta x$ so that $\Sigma_{j=1}^{n} \Delta x_j = 1$ and we update x as follows:

$$x \leftarrow (1-d) \cdot x + d \cdot \Delta x$$

where $d = \gamma - \rho$ is the current duality gap.

Lines 14-15

Compute the new value for h using the updated value of x and also we update the value of $\rho$ as min h.

Lines 16-21

If the previous update of x has achieved a better (bigger) $\rho$, then update the value of $\rho_{max}$, use this new value of $\rho_{max}$ to update v and record x* as the best up to now value for x. If $\rho_{max} = \gamma_{min}$ then exit the algorithm.

In the second part of the iteration step, repeat the same actions for y.

Lines 22-23

Define a m-dimensional vector $\Delta y$ with each $\Delta y_i$ equal to $$\Delta y_i = \begin{cases} v - h_i & \text{if } h_i < v \\ 0 & \text{if } h_i \ge v \end{cases}$$

then normalize $\Delta y$ so that $\Sigma_{i=1}^{m} \Delta y_i = 1$ and we update y as $$y \leftarrow (1-d) \cdot y + d \cdot \Delta y$$

where $d = \gamma - \rho$ is the current duality gap.

Lines 24-25

Compute the new value for g using the updated value of y and also we update the value of $\gamma$ as max g Lines 26-31

If the previous update of y has achieved a better (smaller) $\gamma$, then update the value of $\gamma_{min}$, use this new value of $\gamma_{min}$ to update v and record y* as the best up to now value for y. If $\rho_{max} = \rho_{min}$ then exit the algorithm.

Line 33

The duality gap achieved is $\gamma_{min} - \rho_{max}$.

Upper Bound for the Duality Gap

Numerical experiments on a large number of random matrices have shown that for square matrices (m=n) the duality gap achieved by the novel algorithm disclosed herein is upper bounded by 1/T where T denotes the number of iterations. For non-square matrices this also holds when T>max{m, n}. FIG. 1 shows a graph 104 of the duality gap versus the number of iterations (T) of the lines 11-30 of the Blubit algorithm code disclosed in the Appendix hereinbelow, wherein similar graphs as graph 104 were obtained from a large sample of square matrices whose values were randomly generated. Additionally shown is the graph 108 of the function 1/T, wherein the graph 108 bounds the graph 104.

Performance

The operations count of the novel (Bluebit) algorithm mainly depends on the operations included in lines 14 and 23 where the matrix-vector products h=Ax and g=y'A are computed. Each of these multiplications require at most m×n multiplications, wherein matrix A is m×n. Also the operation count is directly proportional to the number of iterations T. Therefore, as one of ordinary skill in the art will understand, the number of multiplications required is 2×m×n×T. If m and n are significantly large (e.g., 500 or greater), then the number of multiplications is dominated by m and n. Note that this implies that the computational complexity of the Bluebit algorithm is no more than O(m×n×T) as one skilled in that art will understand since the number of multiplications dominate all other computations performed.

Numerical experiments conform to the above theoretical expectation of the number of operations performed by the (Bluebit) algorithm. In order to demonstrate this, a collection of random matrices of various sizes were generated, and a minimax solution was computed by two methods. The first method transformed the Minimax problem to a LP problem and then the LP problem was solved using the Simplex method as it is implemented by the software package Mathematica. The second method solved the Minimax method directly using the Bluebit algorithm disclosed herein. The following table lists the resulting timings in seconds.

TABLE 1

| | Algorithm used | | |
|---|---|---|---|
| Matrix Size | Simplex Method | Bluebit Algorithm T = 1,000 | Bluebit Algorithm T = 10,000 |
| 10 × 10 | 0.000 | 0.187 | 1.828 |
| 50 × 50 | 0.047 | 0.469 | 4.594 |
| 100 × 100 | 0.500 | 0.922 | 9.265 |
| 250 × 250 | 5.547 | 1.203 | 11.734 |
| 500 × 500 | 45.125 | 3.203 | 31.297 |
| 750 × 750 | 174.281 | 5.656 | 55.875 |
| 1000 × 1000 | 388.406 | 8.312 | 82.875 |
| 1250 × 1250 | 685.125 | 11.594 | 115.890 |
| 1500 × 1500 | 1374.470 | 15.172 | 150.797 |

We may conclude that for large matrices (e.g., square matrices greater than 250×250), the Bluebit Algorithm executes faster than the Simplex Algorithm, even when high accuracy is required, e.g., T=10,000. For example, if the required accuracy for the duality gap is about 0.1%, then 1000 iterations are enough and the Bluebit algorithm executes faster for 250×250 matrices. If the required accuracy is higher (duality gap less than 0.01%), then the Bluebit algorithm becomes the preferable method for matrices bigger than 500×500.

Figure 2:
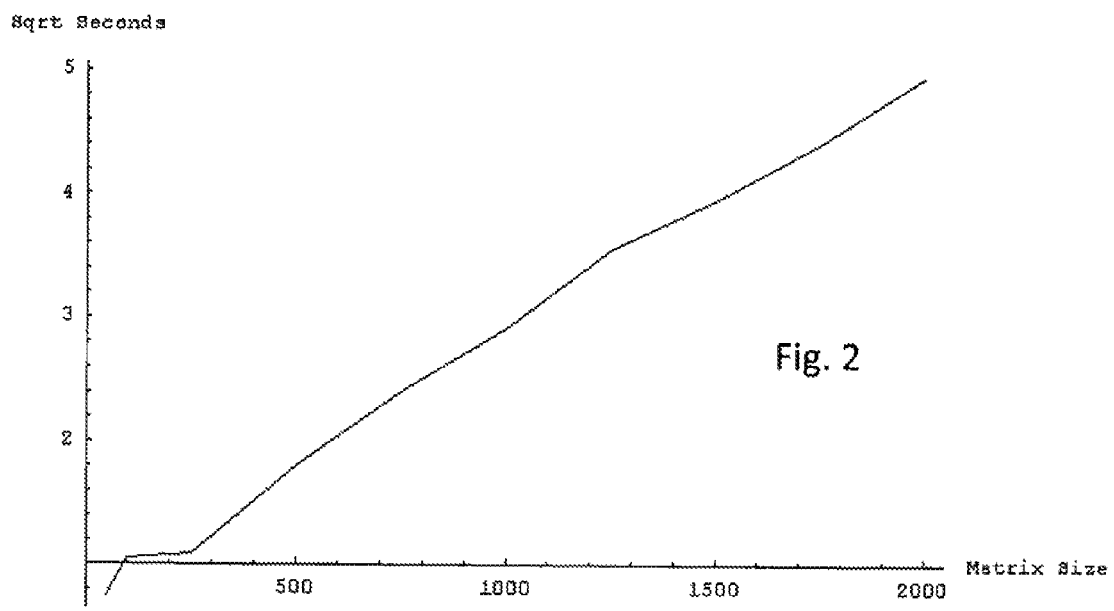
FIG. 2 shows a graph of the square root of the execution time of the Bluebit algorithm versus the matrix size for random square matrices. As it can be seen the graph is close to linear and therefore it is close to theoretical expectation.

FIG. 2 shows a graph of the square root of the execution time of the Bluebit algorithm against the matrix size for a random square matrices. As it can be seen the graph is close to linear and therefore it is close to theoretical expectation.

The Appendix hereinbelow shows the Mathematica® source code for generating: (a) the graph 104 of FIG. 1, (b) the information in Table 1 hereinabove, and (c) the graph of FIG. 2.

Application of the New Minimax Algorithm

Figure 3:
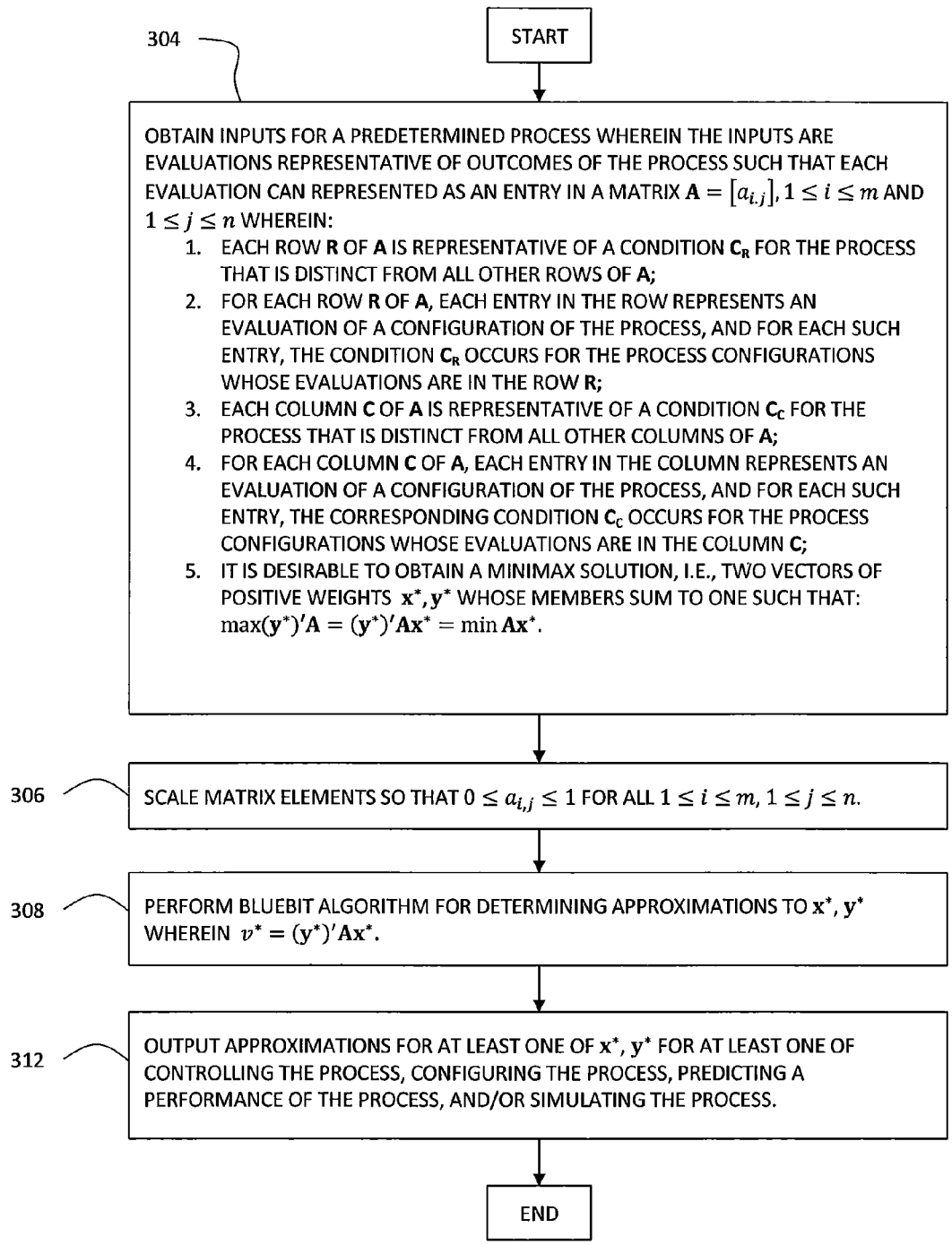
FIG. 3 is a high level flowchart demonstrating the use of the novel Bluebit minimax algorithm, wherein the steps of this flowchart may be used in solving minimax problems in a large plurality of application domains.

The novel minimax algorithm may be embodied in a computational system as illustrated in the flowchart shown in FIG. 3. In one embodiment, the steps of FIG. 3 may be performed in determining optimal game plays in particular games and/or contests with advisories, wherein the input evaluations of step 304 can be the payoff matrix in a zero sum game. Subsequently, in step 306, the entries $a_{i,j}$ of A are scaled so that $0 \leq a_{i,j} \leq 1$. Then the Bluebit algorithm is performed in step 308, so that the approximations for the actual or theoretical values of x*, y* (such approximations being identified with x*, y* in the descriptions of the Bluebit algorithm above) may be output in step 312. Note that for the process being a game, such output represents the optimal mixed strategies of the game for each one of the opponents respectively, as one of ordinary skill will understand. In particular, such output may be for, e.g., display on a computer monitor, or for actually configuring the game according to one of the approximations to x*, y*. Such optimally computed game plays may be presented on a computer monitor having a representation of the game (e.g., chess).

Alternatively, the input evaluations of step 304 may be related to any problem which can formulated as a zero sum game, e.g., a military operation, wherein such input may be a matrix representing potential gains/losses in a battle field or gains/losses in evaluations of strategic positions; i.e., the rows/columns of the matrix represent potential moves of each of the opponents, and the matrix entries represent gains/losses for their respective moves. Thus, such input may be provided to another process or computational system such as a military command and control center, wherein the output of step 312 may be then suggested as optimal mixed strategies regarding allocation of resources and/or military forces.

In another embodiment, the flowchart of FIG. 3 may be also used in efficiently implementing a system and method for providing decision systems as disclosed in U.S. Pat. No. 5,649,068 filed May 16, 1996 which is fully incorporated herein by reference. In this embodiment, the inputs of step 304 may be a matrix containing the success/failure data (represented as 0/1 binary numbers) of each predictive function applied on the problem for each sample (e.g., each column of the matrix representing a unique one of the predictive functions, and each row representing a unique one of the samples), and the output of step 312 may be the weights by which each one of the predictive (kernel) function is combined in order to form the ensemble predictor. Note that a very similar technique for boosting is explained in detail hereinbelow.

Additionally/alternatively, the present minimax algorithm and the flowchart of FIG. 3 may be used to configure, control, perform a prediction and/or perform a simulation of various other computational systems such as expert systems, decision making/decision support systems as well as configure, control, perform a prediction and/or perform a simulation of various domain specific physical systems as one of ordinary skill in the art will understand. In particular, various operational parameters of such systems may be determined using the present minimax algorithm and the steps of FIG. 3. For example, FIG. 3 may be utilized to perform the minimax computations in the following references:

(a) In U.S. Patent Application Publication No. 20070104222 by Luss filed Nov. 7, 2005, which is fully incorporated herein by reference, an optimal allocation of bandwidth among a plurality of video-on-demand (VOD) programs available on each link of a VOD tree network is disclosed, where a server at the root node of the tree network broadcasts the multiple VOD programs. According to the application by Luss, each node in the network has demands for a subset of the programs, and each link connecting nodes together in the network has a limited amount of available bandwidth capacity. The available bandwidth is allocated on each link optimally among all programs that are carried on that link. The bandwidth allocated to a specific program may be different on different links of the network, since the bandwidth allocated may be decreased, but not increased, from one link to the next along the paths from the root node to the destination nodes. The methods use equitable resource allocation models with a lexicographic minimax objective function. The first method finds optimal solutions while satisfying the capacity constraints on all links, tree-like ordering constraints for the bandwidth allocated to each of the programs, and lower and upper bounds on bandwidth allocation for each program. The second method finds optimal solutions to a more restrictive scheme that imposes additional constraints which require equal bandwidth allocation for a specific program on all relevant links emanating from the same node in providing various minimax solutions. At least some of the optimizations identified above utilize a minimax procedure, and accordingly an embodiment of FIG. 3 may be used. In particular, the input evaluations of step 304 may be represented by an instance of the matrix A having the values of performance function $F_{np}(x_{np})$ as described in equation (4.1) in the Luss application, and for such input evaluations, the output approximations of step 312 may be the vector of values, $x_{lp}$, each such value representing the bandwidth allocated on link l for program p. Of course, various other resource allocation problems may be solved efficiently using the present Bluebit algorithm. In particular, it is not uncommon for such resource allocation problems to have thousands of resources to allocate.

(b) In U.S. Patent Application No. 2005/0192865 filed Sep. 1, 2005, which is fully incorporated herein by reference, method for selecting a desirable allocation of bids in a combinatorial exchange or auction setting where there are bids for bundles of items with various side constraints is disclosed. It is believed that an embodiment of FIG. 3 may be used in the selecting process.

(c) In U.S. Pat. No. 5,325,445 filed May 29, 2005, which is fully incorporated herein by reference, a feature classification for statistical pattern recognition is disclosed, wherein a hierarchical tree is created through a minimax type decompositional segregation as n-dimensional feature vectors of different feature classifications . An embodiment of FIG. 3 may be used in the decompositional segregation process.

(d) In U.S. Pat. No. 6,510,746 by Kotwicki filed Jul. 12, 1999, which is fully incorporated herein by reference, a method for efficiently implementing a system and method for measuring a gas flow using upstream and downstream pressure measurement, such as for gas flows for an internal combustion engine, is disclosed. An embodiment of FIG. 3 may be used in the gas measurement process. In particular, the output approximations of step 312 may be the X, Z constants as described in the Kotwicki patent.

Portfolio Optimization

A further example of another decision support system that can be enhanced by the novel minimax algorithm disclosed herein is a system for investment optimization which is now described. Assume a given collection of n potential investments indexed by j=1, 2, . . . , n, and their returns over m periods of time indexed by i=1, 2, . . . , m is given. A hypothetical example is shown in the next table (Table 2), where the rows are the periods of time (the row for 1999 being row 1, the row for 2000 being row 2, etc.), and the columns are the potential investments (the column for "cash deposit" being column 1 having the yearly returns for cash, the column for "gold" being column 2 having the yearly returns for gold, etc.):

TABLE 2

| For Year | Cash Deposit | Gold | Stock1 | Stock2 |
|---|---|---|---|---|
| 1999 | 2.5 | 2.6 | 7.8 | −1.9 |
| 2000 | 3.5 | 4.3 | 5.0 | 3.9 |
| 2001 | 1.5 | 4.2 | 5.0 | 2.4 |
| 2002 | 1.8 | 4.7 | 6.2 | 9.4 |
| 2003 | 3.1 | 4.9 | 3.3 | 1.6 |
| 2004 | 1.6 | 5.7 | 0.9 | 1.4 |
| 2005 | 3.5 | 0.1 | 3.6 | 4.4 |
| 2006 | 2.8 | 5.4 | −0.4 | 2.2 |

Let $a_{i,j}$ denote the return of investment j for the period i. In the above example $a_{3,2}$ denotes the return of gold in year 2001 which is 4.2 percent. The returns denoted by $a_{i,j}$ can be considered as a m×n matrix $A=[a_{i,j}]$.

A portfolio is determined by specifying what fraction of one's assets to put into each investment. Therefore, such a portfolio may be represented by a collection of nonnegative numbers $x_j$, j=1, 2, . . . , n that sum to one, wherein $x_1$ corresponds to the fractional portion of the portfolio invested in "cash deposits", $x_2$ corresponds to the fractional portion of the portfolio invested in "gold"., etc. Accordingly, the portfolio is represented as a n dimensional vector $x=(x_1, x_2, \ldots, x_n)$ with $\sum_{j=1}^{n} x_j = 1$.

The return that one would obtain using a given portfolio for the period i is given by $$h_i = \sum_{j=1}^{n} a_{i,j} x_j$$

and the returns for this same portfolio for all time periods arranged in a vector is $h=(h_1, h_2, \ldots, h_m)$ wherein h is given by the matrix-vector product $h=Ax$ It is assumed that history repeats itself and the laws dominating investment markets in previous years will continue to be valid in the future too. In the most simplified case, an investor may ignore other factors such as the risk of each investment when seeking for a portfolio which maximizes its minimum return over the past history. Therefore she/he wishes to optimize the portfolio selection x in order to maximize the minimum return. It is known in theory that such optimum selection exists, and it is achieved by x* where x* is the minimax solution for the matrix.

The assumption that "history repeats itself" may be interpreted as follows: regarding the investment returns, every future year is going to be either a repetition of one single previous year, or a "mixture" of previous years—namely a convex combination of previous years. For example the investment returns on a hypothetical future year could be 30% of the returns of 1999, plus 20% of the returns of 2002, plus 50% of returns of 2005, and zero weight assigned for all other years. Note that such a "mixture" could be additionally/alternatively interpreted in a manner such that future return of each investment will be determined in the same manner for all investments; i.e., convex combination of returns of previous years.

The weights for each year, such as the percentages immediately above, may be represented in vector form, and accordingly are represented by the vector y, e.g., (0.3, 0.0, 0.0, 0.0, 0.2, 0.0, 0.0, 0.5) for the percentage weights above. A conservative investor may consider the investment market as an opponent who would try to form a convex combination of an agreed upon collection of investments of previous years (wherein the weight of each year is represented by $y_i$) in order to minimize the investor's potential return in, e.g., the next year. Therefore the investor should try to find a portfolio x which, even in the worst case convex combination of the previous years y selected by the investment market, will still give a certain minimum return, and she/he will try to make this minimum return as large as possible. The formulation of the problem as described hereabove is as a zero sum game with two opponents being able to play mixed strategies.

In the above numerical example corresponding to Table 2, the optimal portfolio is given by x*=(0.711, 0.3183, 0.2468, 0.2637) which in practice means that the investor should invest 17.11% of his/her fortune in cash deposit, 31.83% in gold, 24.68% in stock1 and 26.37% in stock2. Also the worst case scenario selected by the investment market opponent is given by y*=(0.0760, 0, 0, 0, 0, 0.3695, 0.4940, 0.0605) which in practice means a hypothetical year in which the returns are a mixture consisting of 7.60% of year 1999, 36.95% of 2004, 49.40% of 2005 and 6.05% of year 2006. The point of equilibrium is given by (y*)'Ax*=2.68.

The above result can be interpreted by any of the following ways:

a) If the investor selects the portfolio x* immediately above, then for any combination of previous years y selected by the investment market opponent, the investor will achieve an annual return of at least 2.68%.

b) If the investment market opponent selects the worst case convex combination of the previous years y*, then for any portfolio x that the investor might chose, the investor will receive a return at most 2.68%.

The returns per year and per investment are those as shown in next table:

TABLE 3

| | | x* = | | | | |
|---|---|---|---|---|---|---|
| | | 0.1711 | 0.3183 | 0.2468 | 0.2637 | |
| | | Cash | | | | Portfolio |
| y* = | Year | Deposit | Gold | Stock1 | Stock2 | Return |
| 0.0760 | 1999 | 2.5 | 2.6 | 7.8 | −1.9 | 2.68 |
| 0.000 | 2000 | 3.5 | 4.3 | 5.0 | 3.9 | 4.23 |
| 0.000 | 2001 | 1.5 | 4.2 | 5.0 | 2.4 | 3.46 |
| 0.000 | 2002 | 1.8 | 4.7 | 6.2 | 9.4 | 5.81 |
| 0.000 | 2003 | 3.1 | 4.9 | 3.3 | 1.6 | 3.33 |
| 0.3695 | 2004 | 1.6 | 5.7 | 0.9 | 1.4 | 2.68 |

TABLE 3-continued

| | | x* = | | | |
|---|---|---|---|---|---|
| y* = | Year | 0.1711 Cash Deposit | 0.3183 Gold | 0.2468 Stock1 | 0.2637 Stock2 | Portfolio Return |
| 0.4940 | 2005 | 3.5 | 0.1 | 3.6 | 4.4 | 2.68 |
| 0.0605 | 2006 | 2.8 | 5.4 | −0.4 | 2.2 | 2.68 |
| | Average Return | 2.68 | 2.68 | 2.68 | 2.68 | |

One may verify that if the investor selects the portfolio x* for x, then the return for the year 1999 will be 2.5×0.1711+ 2.6×0.3183+7.8×0.2468−1.9×0.2637=2.68. Also if the market selects y* for y, then the return for Cash Deposit will be 2.5×0.0760+1.6×0.3695+3.5×0.4940+2.8×0.0605=2.68.

The formulation of the problem above is exactly the same as a minimax problem which can be solved by the Bluebit algorithm disclose herein. In particular, FIG. 3 may be used in the process of configuring the portfolio. For instance, the input evaluations of step 304 may be the matrix A containing the past history, the returns of potential investments across different periods of time (each row of the matrix representing returns of various investments for the same time period and each column representing returns of the same investment across different time periods), and for such input evaluations, the output approximations of step 312 may be x* which is the optimal portfolio (fractions of one's assets that should be invested on various potential investments) and y* as worst case scenario that could be selected by the investment market opponent.

A more complex model, including risk as a factors, has been developed by the Nobel Prize winner Harry Markowitz in his book "Portfolio Selection Efficient Diversification of Investments", The methods disclosed in this book rely upon solving minimax or linear programming problems, and accordingly, the flowchart of FIG. 3 may be applied in place of the prior art minimax techniques. Additionally, as disclosed hereinbelow, since linear programming problems may be converted into minimax problems, large linear programming problems may be solved using the Bluebit algorithm and/or the steps of FIG. 3.

In real world portfolio configuration, the matrix A would have been larger, e.g., 50 rows and 5000 columns or more. For example, instead of including just four potential investments several thousands could have been included. Also, historical data for 50 years could have been included. Additionally, instead of measuring each investment's performance yearly, measurements may be performed on a monthly, weekly or in daily basis. Accordingly, the matrix A may have thousands of rows and tens of thousands of columns. The novel Bluebit algorithm provides a computationally efficient technique for determining an investment portfolio.

Machine Learning—Boosting

Machine boosting techniques may also use the steps of FIG. 3. The goal of machine boosting is to combine a plurality of simple "rules of thumb", "wizards", "hypotheses" or "weak classifiers" (these terms being used substantially synonymously for referring to agents for generating proposed results to a particular set of conditions) to form an ensemble or aggregate result based on individual results from more than one of the plurality of wizards, wherein the aggregate result is expected to perform better that the individual wizards or rules of thumb. The terminology used to describe such an ensemble or aggregate classifier varies, but the underlying idea is the same; e.g., usually a "past history", a "training set" or an "example set" is given, this information is used to train the weak classifiers and then combine these trained classifiers into one ensemble which performs better than each weak classifiers separately.

Let S be an example set, consisting of m labeled examples indexed by i.

$$S=\{(s_1,l_1), (s_2,l_2), \ldots, (s_i,l_i), \ldots, (s_m,l_m)\}$$

where $s_i$ denotes each example, and $l_i \in \{-1,1\}$ denotes the known actual label of each example. We are also given a number of n weak classifiers $w_1, w_2, \ldots, w_j, \ldots, w_n$ indexed by j each one performing on the class S and predicting its label $$w_j(s_i) \in \{-1,1\}$$

Accordingly, since $l_i$ is the actual label of the example $s_i$, and $w_j(s_i)$ denotes the prediction of the weak classifier $w_j$ for the label of the example $s_i$, the object is to combine the n weak classifiers $w_j$ in order to construct one ensemble binary classifier having the form $$H(s_i)=\text{sign}(c_1 w_1(s_i)+ \ldots +c_j w_j(s_i)+ \ldots +c_n w_n(s_i)) \in \{-1,1\}$$

$$c_j \geq 0 \; \forall 1 \leq j \leq n$$

where sign(b)=−1 wherein b<0, and sign(b)=1 when b≥0.

In the above equation, $c_j$ denotes a nonnegative coefficient with which the output of the weak classifier $w_j(s)$ is combined. Naturally we would like to optimize performance of this ensemble classifier to be as "good" as possible. We are able to modify the performance of the ensemble classifier by modifying the coefficients $c_j$, but doing so requires a criterion, which will help us to evaluate the performance of such ensemble classifiers. As a first evaluation technique, we may pick the training error as our criterion, wherein, e.g., the frequency of misclassified examples is used for evaluating the performance of an ensemble classifier as follows:

$$\varepsilon = \frac{1}{n} \sum_{i=1}^{n} [H(s_i) \neq l_i]$$

However, using the training error as a criterion presents some drawbacks. First, there are situations where infinitely many of various ensemble classifiers may have zero training error. Accordingly, the question arises, should we consider all of such ensemble classifiers equally as good, or are one or more of them better than the others. Second, if the training error is zero for a particular one or more ensemble classifiers, then the training error does not allow for continuing with the optimization. Before justifying the use of a different criterion, we are going to have a closer look at the definition of the binary classifier and the definition of its training error. Recall that we defined the binary classifier as $$H(s_i) = \text{sign}(c_1 w_1(s_i) + \ldots + c_j w_j(s_i) + \ldots + c_n w_n(s_i))$$

$$= \text{sign}\left(\sum_{j=1}^{n} c_j w_j(s_i)\right)$$

If we consider the following term as a separate function $$\mathcal{H}(s_i) = \sum_{j=1}^{n} c_j w_j(s_i)$$

then the binary classifier H(s) becomes the sign of the $\mathcal{H}(s)$ function, i.e., $$H(s_i) = \text{sign}(\mathcal{H}(s_i)).$$

The function $\mathcal{H}(s_i)$ may be considered as a confidence level classifier; i.e., the greater (more positive) its value, the greater the confidence that the circumstances indicative of 1 holds, and the lower (more negative) its value, the greater the confidence that the circumstances indicative of −1 holds. When the binary classifier $H(s_i)$ makes a correct prediction, then the label $l_i$ and the confidence level classifier $\mathcal{H}(s_i)$ have the same sign, therefore $l_i \cdot \mathcal{H}(s_i) \geq 0$. On the contrary when a false prediction is made, then $l_i \cdot \mathcal{H}(s_i) < 0$. This leads to the following redefinition of the error:

$$\varepsilon = \frac{1}{n}\sum_{i=1}^{n}[l_i \cdot \mathcal{H}(s_i) < 0]$$

If the training error is selected as the training criterion as in the equation immediately above, what we have actually done is pick an arbitrary constant, which is 0 is this case, and use the frequency of the product $l_i \cdot \mathcal{H}(s)$ being below this constant in order to compute the error. However, instead of picking zero as the constant, another number may be selected. That is, suppose that instead of using 0 as a threshold for the products $l_i \cdot \mathcal{H}(s)$, we pick a number ρ such that $$l_i \cdot \mathcal{H}(s_i) \geq \rho \ \forall 1 \leq i \leq m$$

and then we try to make ρ as big as possible. Then the optimization problem becomes $$c = \arg\max_c \rho = \arg\max_c \min_i (l_i \cdot \mathcal{H}(s_i))$$
$$c_j \geq 0 \ \forall 1 \leq j \leq n$$

This approach among other advantages has the obvious benefit that we are allowed to continue optimizing the ensemble classifier after the training error has zeroed, and this is the point when ρ becomes >0. The performance of the binary classifier $$H(s_i) = \text{sign}(\mathcal{H}(s_i))$$

is not affected if we scale the output of the confidence level classifier $\mathcal{H}(s)$. That is, we are not interested in the pure output of this classifier, but rather we prefer to compare the output with its potential maximum or minimum value. Therefore, we normalize its output in the following sense $$\mathcal{H}(s_i) = \frac{1}{\sum_{j=1}^{n} c_j} \sum_{j=1}^{n} c_j w_j(s_i)$$

For convenience, define a second set of parameters $x_j$ so that from now on we will refer to normalized parameters $$x_j = \frac{c_j}{\sum_{j=1}^{n} c_j}$$
$$x_j \geq 0 \ \forall 1 \leq j \leq n$$

And of course, the following holds:

$$\sum_{j=1}^{n} x_j = 1$$

Also we do the following replacement $$a_{i,j} = l_i w_j(s_i)$$

and we may think of those values of $a_{i,j}$ arranged in a m×n matrix A $$A = \begin{vmatrix} a_{1,1} & a_{1,2} & \cdots & a_{1,n} \\ a_{2,1} & a_{2,2} & \cdots & a_{2,n} \\ \vdots & \vdots & \ddots & \vdots \\ a_{m,1} & a_{m,2} & \cdots & a_{m,n} \end{vmatrix}$$

And finally, using the new variables the optimization problem becomes $$\max_c \rho = \max_c \min_i (l_i \cdot H(s_i))$$
$$= \max_c \min_i \left( l_i \cdot \frac{1}{\sum_{j=1}^{n} c_j} \sum_{j=1}^{n} c_j w_j(s_i) \right)$$
$$= \max_x \min_i \left( \sum_{j=1}^{n} l_i w_j(s_i) \cdot x_j \right)$$
$$= \max_x \min_i \left( \sum_{j=1}^{n} a_{i,j} \cdot x_j \right)$$
$$= \max_x \min_i Ax$$

with $$\sum_{j=1}^{n} x_j = 1 \text{ and } x_j \geq 0, \forall 1 \leq j \leq n$$

Again, we have formulated the problem as a minimax problem which can be solved by the Bluebit algorithm, wherein, e.g., parameters for an ensemble classifier are determined.

Computational boosting applications can be enhanced using the Bluebit algorithm for various applications such as face detection and/or recognition, medical diagnosis, and decision making. The following references provide examples of boosting techniques and applications, each of these references are herein incorporated by reference:

(a) U.S. Pat. No. 6,546,379 by Hong et. al, filed Oct. 26, 1999 which discloses additional boosting applications and boosting techniques;

(b) U.S. Pat. No. 7,099,505 by Li et. al. filed Nov. 3, 2005 which discloses additional boosting applications and boosting techniques;

(c) U.S. Patent Application No. 2007/0053563 by Tu et. al, filed Mar. 2, 2006 which is directed to image detection and classification may utilize the steps of FIG. 3 wherein the input evaluations of step 304 may be a matrix containing the success/failure data of each weak classifier for each sample in binary 0/1 form, and the output approximations of step 312 may be the weights for combining the weak classifiers as described in paragraph [0035] of the application by Tu et. al.;

(d) U.S. Patent Application No. 2003/0110147 by Li et. al. filed Mar. 4, 2002 which is directed to a statistical learning procedure for, e.g., detection of faces, speech recognition, text classification, image retrieval, document routing, online learning, and medical diagnosis. In particular, the steps of FIG. 3 may be used in conjunction with this statistical learning procedure wherein, e.g., the input evaluations of step 304 may be a m×n matrix A with elements a[i, j] where a[i, j] equals to 1 if weak classifier j predicts correctly for the sample i and equals 0 elsewhere, and the output approximations of step 312 may be: (i) x* a list of weights by which the weak classifiers are combined in order to form the ensemble classifier (in case any of the weights equals to zero, the weak classifier is excluded), and (ii) y* weights assigned to the sample set which can be used for training additional classifiers or retraining the included classifiers.

Solving LP Problems

Figure 4:
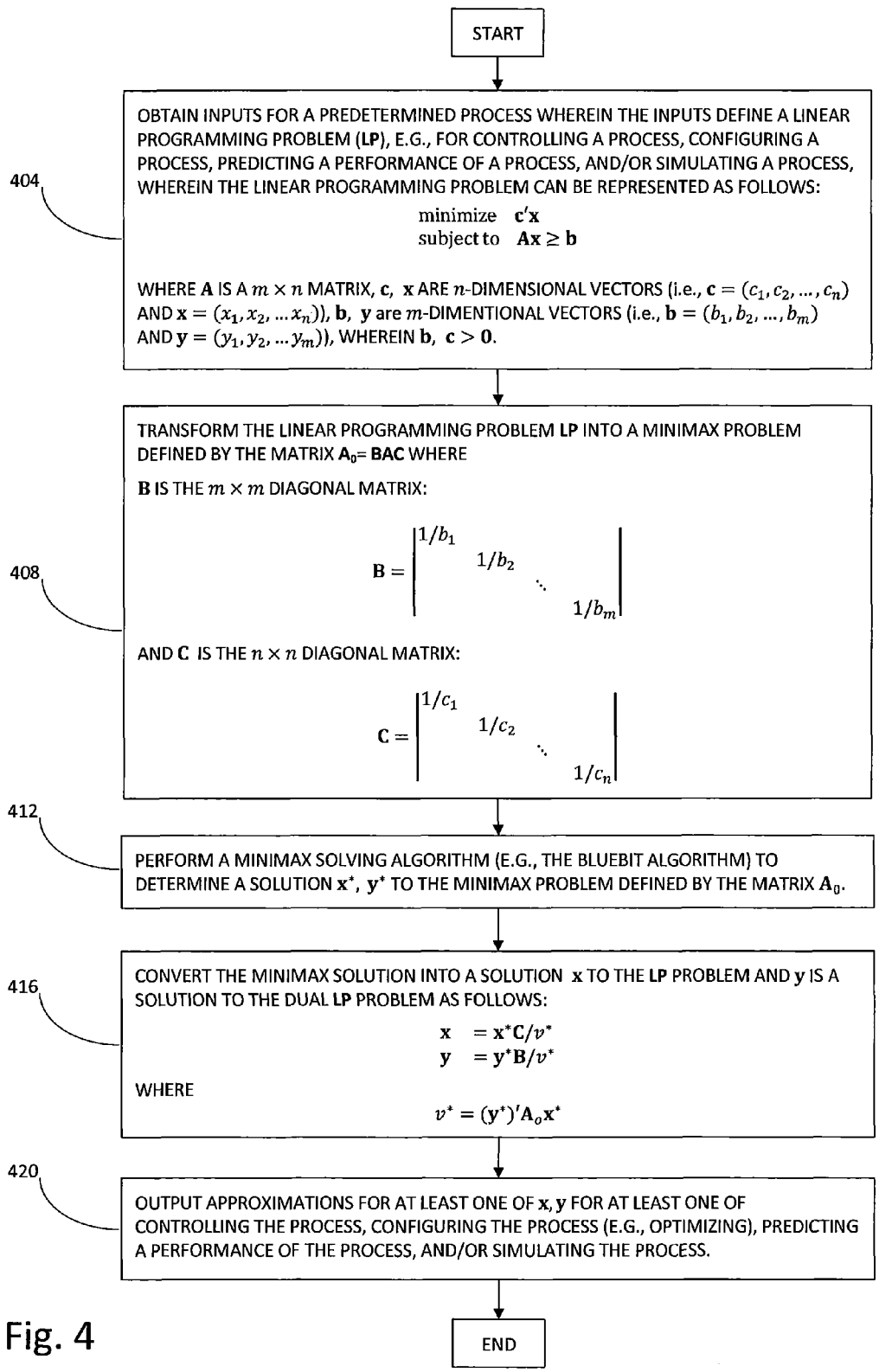
FIG. 4 is a high level flowchart demonstrating the use of the novel conversion of linear programming problems to minimax problems, wherein the steps of this flowchart may be used in solving linear programming problems in a large plurality of application domains.

The present minimax algorithm may be also used in efficiently implementing a method for solving linear programming problems as shown, e.g., in the flowchart of FIG. 4. However, prior to describing how the novel minimax method can be used for solving LP problems, additional technical background material is provided in the following Transforming Minimax to LP Problems section.

Transforming Minimax to LP Problems

Traditional methods of solving minimax problems involve the transformation of the minimax problem to a Linear Programming (LP) problem. The resulting LP problem is then solved either by the Simplex method or by using an interior point method such as the Karmarkar's algorithm as one of ordinary skill in the art will understand.

Let's consider a m×n matrix A. We are asked to find, the probability vectors x, y that are to be determined such that:

$$\max_{x \in \mathcal{X}} \min_{y \in \mathcal{Y}} y'Ax = \min_{y \in \mathcal{Y}} \max_{x \in \mathcal{X}} y'Ax \qquad (2.1)$$

Let v be the game value. Then $$\gamma^* = \max_{1 \le j \le n} (y^*)'A = v = \min_{1 \le i \le m} Ax^* = \rho^* \qquad (2.2)$$

Define $e_n = \{1\}^n$, $e_m = \{1\}^m$ as n and m dimensional column vectors with all elements set to 1. Construct the following LP problem:

$$\text{minimize } e_n'x_o \qquad (2.3)$$

$$\text{subject to } Ax_o \ge e_m \qquad (2.4)$$

and its dual problem:

$$\text{maximize } e_m'y_o \qquad (2.5)$$

$$\text{subject to } A'y_o \le e_n \qquad (2.6)$$

The solution to the above LP problem and its dual problem will be:

$$e_n'x_o = e_n'y_o = v_o \qquad (2.7)$$

and because of the constraints in (2.4), the following implication is obtained $$Ax_o \ge e_m \Rightarrow \qquad (2.8)$$

$$Ax_o/v_o \ge e_m/v_o \qquad (2.9)$$

Replacing $x = x_o/v_o$ we get $$Ax \ge e_m/v_o \Rightarrow \qquad (2.10)$$

$$\rho = \min_{1 \le i \le m} Ax \ge \frac{1}{v_0} \qquad (2.11)$$

and using similar reasoning, the following is obtained $$\gamma = \max_{1 \le j \le n} y'A \le \frac{1}{v_0} \qquad (2.12)$$

Combining (1.11), (2.11) and (2.12), we get $$\rho = \min_{1 \le i \le m} Ax = \max_{1 \le j \le n} y'A = \gamma \qquad (2.13)$$

At the same time it will be $$v_0 = e_n'x_0 = \sum_{j=1}^{n} x_{0j} \qquad (2.14)$$

and consequently for $x = (x_1, x_2, \ldots, x_n)$, and $x = x_0/v_0$ from above, we obtain $$x_j = \frac{x_{0j}}{\sum_{j=1}^{n} x_{0j}} \qquad (2.15)$$

therefore $$\sum_{j=1}^{n} x_j = 1 \qquad (2.16)$$

and using similar reasoning, the following is obtained $$\sum_{i=1}^{m} y_i = 1 \qquad (2.17)$$

Thus, we may conclude x, y are probability vectors, and also because of (2.13), they provide a minimax solution.

Transforming LP to Minimax Problems

In the previous section we described the known method for solving minimax problems via the solution of a LP problem. In this section, a novel technique is disclosed for solving LP problems by converting such problems to minimax problems, and then, e.g., applying the novel minimax solving algorithm described hereinabove.

Define as LP1 the Linear Programming problem:

$$\text{minimize } c'x \quad (3.1)$$

$$\text{subject to } Ax \geq b \quad (3.2)$$

and DP1 as its dual problem:

$$\text{maximize } b'y \quad (3.3)$$

$$\text{subject to } y'A \leq c \quad (3.4)$$

where A is a m×n matrix, c, x are n-dimensional vectors (i.e., $c=(c_1, c_2, \ldots, c_n)$ and $x=(x_1, x_2, \ldots x_n)$), b, y are m-dimensional vectors (i.e., $b=(b_1, b_2, \ldots, b_m)$ and $y=(y_1, y_2, \ldots y_m)$). We assume that b, c>0. If any of $b_i$, $c_j$ is negative or zero, then apply a pivot operation so that it becomes positive.

Define B as the m×m diagonal matrix:

$$B = \begin{vmatrix} 1/b_1 & & & \\ & 1/b_2 & & \\ & & \ddots & \\ & & & 1/b_m \end{vmatrix} \quad (3.5)$$

Then the constraints in (3.2) can be written as:

$$(BA)x \geq e_m \quad (3.6)$$

where again $e_m$ is a m-dimensional vector of 1's. Define the Linear Programming problem LP2 as:

$$\text{minimize } c'x \quad (3.7)$$

$$\text{subject to } (BA)x \geq e_m \quad (3.8)$$

and DP2 as its dual problem $$\text{maximize } e_m'y \quad (3.9)$$

$$\text{subject to } y'(BA) \leq c \quad (3.10)$$

As one of ordinary skill in the art will understand, if x is a solution for LP1, then it will be a solution for LP2 as well. Let $y_1$, $y_2$ be the solutions for DP1 and DP2, respectively. It is easy to see that $$y_1 = y_2 B \quad (3.11)$$

Now define the n×n diagonal matrix C as:

$$C = \begin{vmatrix} 1/c_1 & & & \\ & 1/c_2 & & \\ & & \ddots & \\ & & & 1/c_n \end{vmatrix} \quad (3.12)$$

and define $A_o$ as $$A_o = BAC \quad (3.13)$$

Define LP3 as the Linear Programming problem:

$$\text{minimize } e_n'x \quad (3.14)$$

$$\text{subject to } A_o x \geq e_m \quad (3.15)$$

where $e_n$ is a n-dimensional vector of 1's and define DP3 as the dual problem:

$$\text{maximize } e_m'y \quad (3.16)$$

$$\text{subject to } y'A_o \leq e_n \quad (3.17)$$

Let $x_3$, $y_3$ be the solutions for LP3 and DP3, respectively. They are related to the solutions of the original problems LP1, DP1 by the following equations:

$$x_1 = x_3 C \quad (3.18)$$

$$y_1 = y_3 B \quad (3.19)$$

In section Transforming Minimax to LP Problems above, we have seen that problems like LP3 are closely related to a minimax problem. Let x*, y* be a minimax solution of the matrix $A_o$ so that $$y'A_o x^* \geq v^* = (y^*)'A_o x^* \geq (y^*)'A_o x \; \forall x \in \mathcal{X}, \Delta y \in \mathcal{Y} \quad (3.20)$$

We have shown hereinabove that x*, y* are connected to $x_3$, $y_3$ by the relations:

$$x_3 = x^*/v^* \quad (3.21)$$

$$y_3 = y^*/v^* \quad (3.22)$$

so substituting (3.21) into (3.18), and substituting (3.22) into (3.19) results in (3.23)

$$x_1 = x^*C/v^* \quad (3.21)$$

$$y_1 = y^*B/v^* \quad (3.24)$$

where $$v^* = (y^*)'A_o x^* \quad (3.25)$$

Therefore, we conclude that in order to solve a LP problem as defined in (3.1)-(3.2) and its dual as defined in (3.3)-(3.4), we first define matrices B and C as in (3.5) and (3.12), and the matrix $A_o = BAC$. Then we compute a minimax solution x*, y* for matrix $A_o$, and we then retrieve the solutions for the original problems LP1 and DP1 by (3.23), (3.24) and (3.25).

Accordingly, the above disclosed technique for transforming a linear programming problem into a minimax problem provides the advantage that the highly efficient Bluebit algorithm may be used to efficiently solve large linear programming problems. In particular, FIG. 4 provides a flowchart for transforming a linear programming problem into a minimax problem, and then solving the minimax problems for thereby obtaining a solution to the linear programming problem.

The application areas for which this technique may be applied are too numerous to fully list since linear programming techniques are widely used throughout engineering. In particular, linear programming problems have been or can be formulated for substantially any plurality of constraints that are (or can be reasonably approximated) by linear functions of the problem's parameters. Thus, linear programming problems can be formulated for various applications such as (a) configuration problems (e.g., configuring resource allocation problems for manufacturing), (b) to perform prediction analysis (e.g., network failure predictions), and/or (c) to perform simulations (e.g., financial portfolio simulations). Such linear programming problems can occur in any of the applications described above regarding minimax applications.

Indeed, the present disclosure demonstrates the computational equivalence between minimax problems and linear programming programs in that either type of problem can be solved by formulating and solving a corresponding one of the other of a minimax or linear programming problem. Thus, the above described conversion technique for solving a linear programming problem by converting it to a minimax problem and then using minimax solution techniques (e.g., the steps of FIG. 3) can be applied where, e.g., (a) There is a physical system having a plurality physical constraints to be satisfied, e.g.,
  (i) Find the least expensive combination of foods that will satisfy predetermined nutritional requirements;
  (ii) Minimize the risk in an investment portfolio subject to achieving a certain return;
  (iii) Optimize scheduling having various constraints (e.g., flight schedules as further described below);
  (iv) Optimize types of products produced (e.g., a producer may be capable of producing a plurality of different products from similar production facilities, and it is desirable to optimize the revenue received from these various products while at the same time reducing production expense and/or waste);
  (v) Optimize the assignment of each of n facilities to one of n locations so that the total transportation cost of the flow of materials between the n facilities is minimized.
(b) A prediction or simulation of a physical system, e.g.,
  (i) Analysis of investment markets, network bandwidth allocation, advanced purchase and storage of a material to offset future potential price increases of the material);
  (ii) Failure prediction such as in U.S. Pat. No. 6,714,893 by Busche et. al. filed Feb. 15, 2002 incorporated herein by reference, wherein data is fed into an optimization module that assesses the efficiency of a failure process such that failures can be assessed as to their priority. These priorities are then used to feed a triggering engine that triggers notification of systems and individuals using narrowcasting technology. This system is one that allows early warning of potential problems occurring and integrates data from call centers, legacy systems, retailers, manufacturers, vendor supplied parts, and transportation of parts. In performing the steps of the flowchart of FIG. 4 to practice the method and system disclosed in U.S. Pat. No. 6,714,893, the input for step 404 may be the inputs of the weighting engine 426 as described in the Busche patent and the output of step 420 may be solutions to the required optimization.

An extensive bibliography of linear programming applications may be found in "Quantitative Methods for Business", 6$^{th}$ ed. (St. Paul, Minn.: West Publishing Company, 1995) by David Anderson, Dennis Sweeney, and Thomas Williams which is fully incorporated herein by reference. However, to be more specific, it is believed that the linear programming problems disclosed in the following references (each being fully incorporated by reference herein) provide examples of applications that may benefit from conversion to minimax problems:

(1) U.S. Pat. No. 7,305,641 by Tang filed Jan. 12, 2005 and which discloses a method and a system for redistributing white space on an integrated circuit. The method comprises the steps of providing a series of circuit blocks for the integrated circuit, and placing the blocks on the integrated circuit to obtain a predefined optimal wire length. In accordance with the preferred embodiment it is shown that the problem of placing the blocks to obtain an optimal wire length, can be formulated as linear programming problem. In performing the steps of the flowchart of FIG. 4 to practice the method and system disclosed in U.S. Pat. No. 7,305,641, the input for step 404 may be the linear programming problem described by equations (3), (4), (5), (6) and (9) of the Tang patent, and the output of step 420 may be the parameters $\lambda_i$ related to the wire lengths in the this Tang patent.

(2) U.S. Pat. No. 7,301,615 by Fukagawa filed Jan. 25, 2007 and which discloses an optical apparatus which includes an image forming optical system having a movable optical element, and a driving mechanism configured to move the optical element. The apparatus includes a first block which measures a wavefront aberration of the optical system. A second block obtains a linear evaluation value of an aberration expressed by a linear function of a position of the movable optical element out of aberrations of the optical system, and a quadratic evaluation value of a square of a root mean square of the wavefront aberration measured by the first block expressed by a quadratic function of the position. A third block uses a dummy variable as an upper limit value of the linear evaluation value and obtains a minimum value of the dummy variable by a Linear Programming. A fourth block determines a position of the optical element to be moved by the driving mechanism. In performing the steps of the flowchart of FIG. 4 to practice the method and system disclosed in U.S. Pat. No. 7,301,615, the input for step 404 may be the linear program defined by equations (10), (11), (12), (13) therein, and the output of step 420 may be the minimized variable t and the adjustment amounts $x_k$ of respective components as described in this Fudagawa patent.

(3) U.S. Pat. No. 7,301,341 by Tang filed Oct. 8, 2003 and which discloses a time-optimal MRI gradient design method that utilizes constrained optimization to design minimum-time gradient waveforms that satisfy gradient amplitude and slew-rate limitations. Constraints are expressed as linear equations which are solved using linear programming. In performing the steps of the flowchart of FIG. 4 to practice the method and system disclosed in U.S. Pat. No. 7,301,341, the input for step 404 may be the linear program defined by equations (10), (11), (12) therein, and the output of step 420 may be the values for the $H_x[n]$ and $S_x[n]$ variables of this Tang patent.

(4) The United States Air Force's Military Airlift Command (MAC) uses approximately 1,000 planes (of varying capacity, speed, and range) to ferry cargo and passengers among more than 300 airports scattered around the world. Resource constraints, such as the availability of planes, pilots, and other flight personnel, place limitations or constraints on the capacity of the airlift system. Additionally, MAC must determine whether it is more efficient to reduce cargo and top off the fuel tanks at the start of each flight or to refuel at stops along the way and pay for the costs of shipping fuel. The airlift system also requires that cargo handlers and ground crews be available to service the aircraft. Furthermore, schedulers must be able to deal with disruptions caused by bad weather and emergency changes in shipping priorities. Adding just a couple of percentage points to the efficiency of the airlift system can save the Air Force millions of dollars annually in equipment, labor, and fuel costs. Major commercial airlines, such as American and United, face similar scheduling problems. Complex resource-allocation problems such as these can be solved using linear programming techniques. Business Week, 21 Sep. 1987, pp. 69-76, and 13 Mar. 1989, p. 77.

The foregoing discussion has been presented for purposes of illustration and description. The description is not intended to limit the disclosure and claims supported therefrom to the form and content disclosed herein. In particular, variation and modification commiserate with the above teachings, within the skill and knowledge of the relevant art, are within the scope of the present disclosure. Further, the embodiments described hereinabove are further intended to explain the best mode presently known of practicing each invention recited in the claims hereinbelow, and to enable others skilled in the art to utilize the disclosure herein, or other embodiments thereof, and with the various modifications required by their particular application or uses of the present disclosure.

APPENDIX

We have used Mathematica for coding the Bluebit Algorithm. The first listing following shows the source code that generated the graph in FIG. 1.

```
SeedRandom [0];
m = 100;
n = 100;
A = Table [Random[ ], {m}, {n}];
amax = Max[A];
amin = Min[A];
A = (A – amin) / (amax – amin) ;
x = Table[N [1 / n], {n}];
y = Table[N [1 / m], {m}];
g = y.A;
γ = Max[g];
γmin = γ;
h = A. x ;
ρ = Min[h];
ρmax = ρ;
```

$$v = \frac{\gamma\min + \rho\max}{2};$$

```
T = 1000;
GP1 = Table[0.0, {T}];
GP2 = Table[0.0, {T}];
For[t = 1, t ≤ T, t++,
    dx = UnitStep[g – v] * (g – v) ;
    dx = dx/Total[dx];
    d = (γ – ρ);
    x = (1 – d) * x + d * dx;
    h = A.x;
    ρ = Min[h];
```

$$\text{If}\left[\rho > \rho\max,\ \rho\max = \rho;\ Xo = x;\ v = \frac{\gamma\min + \rho\max}{2}\right];$$

```
    dy = UnitStep[v – h] * (v – h) ;
    dy = dy/Total[dy];
    d = (γ – ρ);
    y = (1 – d) * y + d * dy;
    g = y.A;
    γ = Max[g];
```

$$\text{If}\left[\gamma < \gamma\min,\ \gamma\min = \gamma;\ Yo = y;\ v = \frac{\gamma\min + \rho\max}{2}\right];$$

```
    GP1[[t]] = (γmin – ρmax) ;
    GP2[[t]] = 1/t;
];
Print["Duality Gap=", γmin – ρmax]
Show[
    ListPlot[GP1, PlotJoined → True, DisplayFunction → Identity,
    PlotStyle → {RGBColor [1, 0, 0]}],
```

-continued

```
    ListPlot[GP2, PlotJoined → True, DisplayFunction → Identity,
    PlotStyle → {RGBColor [0, 0, 1]}],
    DisplayFunction → $DisplayFunction, AxesLabel → {"Iter. T",
    "Duality Gap"}]
Export ["Graph1.pdf ", % ]
```

The next listing generates Table 1

```
sizes = {10, 50, 100, 250, 500, 750, 1000, 1250, 1500}
SeedRandom[0];
For[size = 1, size ≤ 9, size++,
    m = sizes[[size]];
    n = sizes[[size]];
    en = Table[1.0, {n}];
    em = Table[1.0, {m}];
    A= Table[Random[ ], {m}, {n}];
    T= 1000;
    bluebit1 = Timing[
        amax = Max[A];
        amin = Min[A];
        A = (A – amin) / (amax – amin);
        x = Table[N[1 / n], {n}];
        y = Table[N [1 / m], {m}];
        g = y.A;
        γ = Max[g];
        γmin= γ;
        h = A.x;
        ρ = Min[h];
        ρmax = ρ;
```

$$v = \frac{\gamma\min + \rho\max}{2};$$

```
        For[t = 1, t ≤ T, t++,
            dx = UnitStep[g – v] * (g – v);
            dx = dx / Total[dx];
            d = (γ – ρ);
            x = (1 – d) * x + d * dx;
            h = A.x;
            ρ = Min[h];
```

$$\text{If}\left[\rho > \rho\max,\ \rho\max = \rho;\ Xo = x;\ v = \frac{\gamma\min + \rho\max}{2}\right];$$

```
            dy = UnitStep[v – h] * (v – h);
            dy = dy / Total[dy];
            d = (γ – ρ);
            y = (1 – d) * y + d * dy;
            g = y.A;
            γ = Max[g];
```

$$\text{If}\left[\gamma < \gamma\min,\ \gamma\min = \gamma;\ Yo = y;\ v = \frac{\gamma\min + \rho\max}{2}\right];$$

```
        ];
    ] [[1]];
    T = 10000;
    bluebit2 = Timing[
        amax = Max[A];
        amin = Min[A];
        A = (A – amin) / (amax – amin) ;
        x = Table[N[1 / n], {n}];
        y = Table[N[1 / m], {m}];
        g = y.A;
```

-continued

```
γ = Max[g];
γmin = γ;
h = A.x;
ρ = Min[h];
ρmax = ρ;

γmin + ρmax
   v = ─────────────;
             2

For[t = 1, t ≦ T, t++,
  dx = UnitStep[g − v] * (g − v);
  dx = dx / Total[dx];
  d = (γ − ρ);
  x = (1 − d) * x + d * dx;
  h = A.x;
  ρ = Min[h];

γmin + ρmax
   If[ρ > ρmax, ρmax = ρ; Xo = x; v = ─────────────];
                                             2 dy = UnitStep[v − h] * (v − h);
  dy = dy/Total[dy];
  d = (γ − ρ);
  y = (1 − d) * y + d * dy;
  g = y.A;
  γ = Max[g];

γmin + ρmax
   If[γ < γmin, γmin = γ; Yo = y; v = ─────────────];
                                             2

];
] [[1]];
simplex = Timing[
    LinearProgramming[en, A, em]
  ] [[1]];
Print ["size=", m, "  simplex=", simplex, "  bluebit1=", bluebit1,
  "bluebit2=", bluebit2];
]
```

This listing generates the graph of FIG. 2

```
sizes = {50, 100, 250, 500, 750, 1000, 1250, 1500, 1750, 2000}
cnt = Length[sizes];
SeedRandom[0];
points = Table[0.0, {cnt}, {2}];
For [size = 1, size ≦ cnt, size++,
  m = sizes[[size]];
  n = sizes[[size]];
  A = Table[Random[ ], {m}, {n}];
  T = 1000;
  points[[size, 1]] = sizes[[size]];
  points[[size, 2]] = Sqrt[Timing [
    amax = Max[A];
    amin = Min[A];
    A = (A − amin) / (amax − amin) ;
    x = Table[N[1 / n], {n}];
    y = Table[N[1 / m], {m}];
    g = y.A;
    γ = Max[g];
    γmin = γ;
    h = A.x;
    ρ = Min[h];
    ρmax = ρ;

γmin + ρmax
       v = ─────────────;
                 2

For[t = 1, t ≦ T, t++,
      dx = UnitStep [g − v] * (g − v) ;
      dx = dx / Total[dx];
      d = (γ − ρ);
      x = (1 − d) * x + d * dx;
      h = A.x;
      ρ = Min[h];
```

```
                                            γmin + ρmax
       If[ρ > ρmax, ρmax = ρ; Xo = x; v = ─────────────];
                                                 2 dy = UnitStep[v − h] * (v − h) ;
      dy = dy / Total[dy];
      d = (γ − ρ);
      y = (1 − d) * y + d * dy;
      g = y.A;
      γ = Max[g];

γmin + ρmax
       If[γ < γmin, γmin = γ; Yo = y; v = ─────────────];
                                                 2

];
  ] [[1]] /. Second → 1];
]
ListPlot [points, PlotJoined → True, AxesLabel → {"Matrix Size",
"Sqrt Seconds"}]
```

What is claimed is:

1. A method for providing an approximate solution $x^*$, $y^*$ to a minimax problem represented by an m by n matrix $A=[a_{i,j}]$, $1 \leq i \leq m$ and $1 \leq j \leq n$, wherein a number T of iterations of a code loop for reducing a duality gap is provided, comprising:

accessing the matrix A from a data store operatively communicating with one or more computer processors, wherein the entries of A are representative of evaluations for a plurality of different circumstances;

storing in the data store an initial candidate of $x=(x_1, x_2, \ldots x_n)$ which is an approximation of $x^*$, and an initial candidate $y=(y_1, y_2, \ldots, y_m)$ which is an approximation of $y^*$;

repeating the steps A through G following with a previously determined candidate approximation x for $x^*$, and a previously determined candidate approximation y for $y^*$, wherein at least one repetition of the steps A through G is performed by the one or more computer processors;

(A) determining at least one estimate v for an equilibrium point of the minimax problem, the estimate being dependent upon x, y, and A;

(B) first obtaining for x at least one adjustment $\Delta x=(\Delta x_1, \Delta x_2, \Delta x_3, \ldots, \Delta x_n)$, wherein at least some $\Delta x_j$, $1 \leq j \leq n$, is dependent upon a difference between: a function dependent upon v, and a result that is dependent upon members of the matrix A and y;

(C) second obtaining for y at least one adjustment $\Delta y=(\Delta y_2, \Delta y_2, \Delta y_3 \ldots, \Delta y_m)$, wherein at least some $\Delta y_i$, $1 \leq i \leq m$, is dependent upon a difference between: a function dependent upon v, and a result that is dependent upon members of the matrix A and x;

(D) first computing, using at least one of the computer processors, an additional candidate approximation for $x^*$ as a combination of x and $\Delta x$;

(E) second computing, using at least one of the computer processors, an additional candidate approximation for $y^*$ as a combination of y and $\Delta y$;

(F) updating the approximation of $x^*$ with the additional candidate approximation for $x^*$ when a predetermined relationship holds between: a result of a predetermined function dependent upon Ax, and, a result of a predetermined function dependent upon a matrix product of A and the additional candidate approximation for $x^*$; and (G) updating the approximation of $y^*$ with the additional candidate approximation for $y^*$ when a predetermined relationship holds between: a result of a predetermined function dependent upon y'A, and, a result of a predetermined function dependent upon a matrix product of the additional candidate approximation for y* and A;

wherein after the repeating step, the values for x* and y* provide the solution to the minimax problem represented by the matrix A;

wherein $\Delta x$ is dependent on at least one positive difference $(\Sigma_{i=1}^{m} a_{ij} \cdot y_j) - v$ for $1 \leq j \leq n$; and wherein $\Delta y$ is dependent on at least one positive difference $v - (\Sigma_{j=1}^{n} a_{ij} \cdot x_j)$ for $1 \leq i \leq m$.

2. The method of claim 1, further including
determining information indicative of one of a plurality of physical conditions using values representative of x* and y*; and
outputting from at least one of the computer processors, the information for at least one of: (i) configuring a system by moving of a physical component of the system, (ii) changing a computer display for representing the one physical condition, (iii) communicating the solution to another computer, and (vi) configuring a portfolio.

3. The method of claim 1, further including a step of outputting from at least one of the computer processors, the information for at least one of: (i) configuring at least one operational parameter of an expert system, (ii) configuring at least one operational parameter for a decision support system, (iii) configuring at least one parameter for an ensemble classifier, (iv) determining a strategy for a zero sum game, and (v) determining an allocation of a plurality of predetermined resources.

4. The method of claim 1, wherein a convex combination of x and $\Delta x$ is obtained for determining the additional candidate approximation for x*.

5. The method of claim 4, wherein the step of updating the approximation of x* includes determining $(1-d)x + d\Delta x$ where d is dependent upon one of: max y'A−min Ax and 1/t where t represents the current loop count.

6. The method of claim 1, wherein prior to a repetition of the first obtaining step, the additional candidate approximation for x* is provided as x.

7. The method of claim 1, wherein a convex combination of y and $\Delta y$ is obtained for determining the additional candidate approximation for y*.

8. The method of claim 7, wherein prior to a repetition of the second obtaining step, the additional candidate approximation for y* is provided as y.

9. The method of claim 1, wherein the determining step includes estimating v in a manner that is dependent upon x, A, and y.

10. The method of claim 1, wherein the first computing step includes computing the additional candidate approximation for x* by determining $$(1 - \gamma + \rho) \cdot x + (\gamma - \rho) \cdot \frac{\Delta x}{\Sigma_{j=1}^{n} \Delta x_j}$$

where $\rho$ is dependent upon a minimum of Ax and $\gamma$ is dependent upon a maximum of y'A.

11. The method of claim 1, wherein the predetermined relationship of the updating step (F) includes determining whether a minimum of Ax is greater than Az, where z is determined from a prior candidate approximation for x*.

12. The method of claim 1, wherein the predetermined relationship of the updating step (G) includes determining whether a maximum of y'A is less than z'A, where z is determined from a prior candidate approximation for y*.

13. The method of claim 1, wherein at least one of $\Delta x$ and $\Delta y$ is a probability distribution.

14. The method of claim 1, wherein prior to a repetition of the first obtaining step, a step of updating x to a convex combination of x and $\Delta x$ is performed.

15. The method of claim 1, wherein prior to a repetition of the first obtaining step, a step of updating y to a convex combination of y and $\Delta y$ is performed.

16. The method of claim 1, wherein prior to a repetition of the determining at least one estimate step, a step of updating v, wherein the updating of v is dependent upon Ax and y'A where y' is the transpose of y.

17. The method of claim 1, further including determining a duality gap.

18. A method for providing a solution x*, y* to a minimax problem represented by an m by n matrix $A = [a_{i,j}]$, $1 \leq i \leq m$ and $1 \leq j \leq n$, comprising:

accessing the matrix A from a data store operatively communicating with one or more computer processors, wherein the entries of A are representative of evaluations of a plurality of different predetermined physical conditions of a predetermined physical system;

storing in the data store an initial approximation $x = (x_1, x_2, \ldots x_n)$ for x*, and $y = (y_1, y_2, \ldots, y_m)$ for y*;

determining at least one estimate v for an equilibrium point of the minimax problem, the estimate dependent upon x, y, and A;

repeating the steps of A through F following, wherein at least one repetition of the steps A through F is performed by the one or more computer processors;

(A) obtaining for x at least one adjustment $\Delta x$, wherein $\Delta x$ is dependent on at least one positive difference between: (i) a predetermined function of entries of A and y, and (ii) v;

(B) obtaining for y at least one adjustment $\Delta y$, wherein $\Delta y$ is dependent on at least one positive difference between: (i) v, and (ii) a predetermined function of entries of A and x;

(C) computing, using at least one of computer processors, an updated value for x from a convex combination of x and $\Delta x$;

(D) computing, using at least one of computer processors, an updated value for y from a convex combination of y and $\Delta y$;

(E) updating x* with the updated value for x when a first predetermined condition holds, wherein the first condition is dependent upon Ax and Az, where z is determined from an instance of x obtained in a prior iteration of the steps A through F;

wherein the step (E) includes replacing x* with x when the first predetermined condition includes determining whether min Ax>min Ax*;

(F) updating y* with the updated value for y when a second predetermined condition holds, wherein the second condition is dependent upon y'A and z'A, where z is determined from an instance of y obtained in a prior iteration of the steps A through F;

wherein the step (F) includes replacing y* with y when the second predetermined condition includes determining whether max y'A<max (y*)'A; and outputting information determined from the values x* and y* for at least one of: (i) arranging components of the physical system, (ii) configuring components of the physical system, (iii) scheduling components of the physical system, or (iv) changing a computer display to represent an configuration or schedule of the physical system.

19. A method of solving a linear programming problem representable in the form:

minimize $c'x$ subject to $Ax \geq b$ where A is a m×n matrix, c, x are n-dimensional vectors such that $c=(c_1, c_2, \ldots, c_n)$ and $x=(x_1, x_2, \ldots x_n)$, and b, y are m-dimensional vectors such that $b=(b_1, b_2, \ldots, b_m)$ and $y=(y_1, y_2, \ldots y_m)$;

wherein there is a dual linear programming problem representable in the form:

maximize $b'y$ subject to $y'A \leq c$, wherein the linear programming problem represents a plurality of constraints to a predetermined physical system, prediction for a predetermined physical system, or simulation of a predetermined physical system, comprising:

providing, in a data storage operatively connected to one or more computers, a first computational representation of a first linear programming problem:

minimize $e'_n x$ subject to $A_o x \geq e_m$ where $e_m$ is a m-dimensional vector of ones, and where $e_n$ is a n-dimensional vector of 1's and where $A_o = BAC$ such that B is the m×m diagonal matrix:

$$B = \begin{vmatrix} \frac{1}{b_1} & & & \\ & \frac{1}{b_2} & & \\ & & \ddots & \\ & & & \frac{1}{b_m} \end{vmatrix}, \text{ and}$$

C is the n×n diagonal matrix:

$$C = \begin{vmatrix} 1/c_1 & & & \\ & 1/c_2 & & \\ & & \ddots & \\ & & & 1/c_n \end{vmatrix};$$

providing, in the data storage operatively connected to the one or more computers, a second computational representation of a dual of the first linear programming problem:

maximize $e'_m y$ subject to $y'(BA) \leq c$;

activating one or more programmatic elements operably provided on the one or more computers, wherein the programmatic elements access the first and second computational representations for determining a solution to a minimax problem defined by $A_o$, wherein the minmax solution x*, y* is determined, and $v^* = (y^*)' A_o x^*$ is determined;

determining a solution $x_1$ to the linear programming problem as: $x_1 = x^* C/v^*$;

providing $x_1$ for use in one of: configuring of the physical system, predicting or simulating a performance of the physical system;

wherein the step of activating includes the steps of accessing, storing, repeating, and determining as follows:

accessing the matrix $A_o$ from a data store operatively communicating with one or more computer processors, wherein the entries of $A_o$ are representative of evaluations for a plurality of different circumstances;

storing in the data store an initial candidate of xapprox= $(xapp_1, xapp_2, \ldots xapp_n)$ which is an approximation of x*, and an initial candidate yapprox=$(yapp_1, yapp_2, \ldots, yapp_m)$ which is an approximation of y*;

repeating the steps A through G following with a previously determined candidate approximation xapprox for x*, and a previously determined candidate approximation yapprox for y*, wherein at least one repetition of the steps A through G is performed by the one or more computer processors;

(A) determining at least one estimate v for an equilibrium point of the minimax problem, the estimate being dependent upon xapprox, yapprox, and $A_o$;

(B) first obtaining for xapprox at least one adjustment $\Delta x = (\Delta x_1, \Delta x_2, \Delta x_3, \ldots, \Delta x_n)$, wherein at least some $\Delta x_j$, $1 \leq j \leq n$, is dependent upon a difference between: a function dependent upon v, and a result that is dependent upon members of the matrix $A_o$ and yapprox;

(C) second obtaining for yapprox at least one adjustment $\Delta y = (\Delta y_1, \Delta y_2, \Delta y_3 \ldots, \Delta y_m)$, wherein at least some $\Delta y_i$, $1 \leq i \leq m$, is dependent upon a difference between: a function dependent upon v, and a result that is dependent upon members of the matrix $A_o$ and xapprox;

(D) first computing, using at least one of the computer processors, an additional candidate approximation for x* as a combination of xapprox and $\Delta x$;

(E) second computing, using at least one of the computer processors, an additional candidate approximation for y* as a combination of yapprox and $\Delta y$;

(F) updating the approximation of x* with the additional candidate approximation for x* when a first predetermined relationship holds between: a result of a predetermined function dependent upon: the product, $A_o \cdot xapprox$, and, a result of a predetermined function dependent upon a matrix product of $A_o$ and the additional candidate approximation for x*;

wherein the step (F) includes replacing the approximation of x* with the additional candidate approximation for x* when the first predetermined condition includes determining whether min $A_o x >$ min $A_o x^*$; and (G) updating the approximation of y* with the additional candidate approximation for y* when a second predetermined relationship holds between: a result of a predetermined function dependent upon the product, yapprox'·$A_o$, and, a result of a predetermined function dependent upon a matrix product of the additional candidate approximation for y* and $A_o$;

wherein the step (G) includes replacing the approximation of y* with candidate approximation for y* when the second predetermined condition includes determining whether max y'$A_o$<max (y*)'$A_o$; and wherein after the repeating step, the values for x* and y* provide the solution to the minimax problem represented by the matrix $A_o$.

20. The method of claim 19, including the steps substantially as provided in FIG. 3.

* * * * *